United States Patent
Davis et al.

(10) Patent No.: US 7,493,894 B2
(45) Date of Patent: Feb. 24, 2009

(54) TANK ASSEMBLY AND COMPONENTS

(75) Inventors: Jeffrey Allen Davis, Brookfield, WI (US); Michael Joseph Holz, West Bend, WI (US); Robert Daniel Tharp, Sussex, WI (US); Austin Raymond Savio Braganza, Milwaukee, WI (US)

(73) Assignee: Kelch Corporation, Menomonee Falls, WI (US)

( * ) Notice: Subject to any disclaimer, the term of this patent is extended or adjusted under 35 U.S.C. 154(b) by 247 days.

(21) Appl. No.: 11/058,063

(22) Filed: Feb. 14, 2005

(65) Prior Publication Data

US 2006/0011173 A1 Jan. 19, 2006

Related U.S. Application Data

(60) Provisional application No. 60/544,933, filed on Feb. 13, 2004.

(51) Int. Cl.
*F02M 33/02* (2006.01)
*B65D 25/00* (2006.01)

(52) U.S. Cl. ................................. 123/519; 220/749

(58) Field of Classification Search ............... 123/518, 123/516, 519, 520; 220/366.1, 303, 371, 220/374, 202, 749
See application file for complete search history.

(56) References Cited

U.S. PATENT DOCUMENTS

| | | | |
|---|---|---|---|
| 2,675,093 A * | 4/1954 | McCall et al. ................. 96/139 |
| 3,748,829 A * | 7/1973 | Joyce et al. .................... 95/146 |
| 3,779,224 A | 12/1973 | Tagawa et al. |
| 3,825,147 A * | 7/1974 | Noponen et al. ....... 220/203.24 |
| 3,961,724 A | 6/1976 | Kapsy |
| 3,999,936 A | 12/1976 | Hasselmann |
| 4,308,840 A | 1/1982 | Hiramatsu et al. |
| 4,312,649 A | 1/1982 | Fujii et al. |
| 4,381,753 A | 5/1983 | Yuzawa et al. |
| 4,572,394 A | 2/1986 | Tanahashi et al. |
| 4,598,686 A | 7/1986 | Lupoli et al. |
| 4,646,702 A | 3/1987 | Matsubara et al. |
| 4,696,409 A * | 9/1987 | Vize ........................ 220/203.2 |
| 4,714,172 A | 12/1987 | Morris |
| 4,770,677 A | 9/1988 | Harris |
| 4,829,968 A | 5/1989 | Onufer |
| 4,836,172 A | 6/1989 | Haruta et al. |
| 4,852,765 A | 8/1989 | Lyzohub |

(Continued)

*Primary Examiner*—Stephen K Cronin
*Assistant Examiner*—Arnold Castro
(74) *Attorney, Agent, or Firm*—Michael Best & Friedrich LLP

(57) ABSTRACT

A tank assembly and a closure device for a tank assembly. The tank assembly may comprise a tank housing defining an interior and an exterior and an opening between the interior and the exterior, a liquid being containable in the interior, vapor being produceable from the liquid, a flow path being defined between the interior and the exterior, a closure housing connectable to the tank housing to selectively close the opening, and adsorption media supported by at least one of the tank housing and the closure housing, vapor being routed along the flow path from the interior of the tank assembly, through the adsorption media and to the exterior of the tank assembly. In some aspects, the adsorption media is supported by the closure housing. In some other aspects, the tank housing includes a receptacle portion having a receptacle interior, the receptacle portion defining the flow path, and the adsorption media is supportable in the receptacle interior.

16 Claims, 13 Drawing Sheets

U.S. PATENT DOCUMENTS

| | | | |
|---|---|---|---|
| 4,884,716 A | 12/1989 | Steiner | |
| 4,886,225 A | 12/1989 | Bates | |
| 4,917,157 A * | 4/1990 | Gifford et al. | 141/59 |
| 4,925,057 A | 5/1990 | Childress et al. | |
| 4,964,531 A | 10/1990 | Caniglia et al. | |
| 5,033,517 A | 7/1991 | Bucci | |
| 5,042,678 A * | 8/1991 | Munguia | 220/254.9 |
| 5,080,078 A | 1/1992 | Hamburg | |
| 5,235,955 A | 8/1993 | Osaki | |
| 5,384,172 A | 1/1995 | Takado et al. | |
| 5,398,839 A | 3/1995 | Kleyn | |
| 5,402,968 A | 4/1995 | Baldwin et al. | |
| 5,408,977 A | 4/1995 | Cotton | |
| 5,431,144 A | 7/1995 | Hyodo et al. | |
| 5,441,637 A | 8/1995 | Gutjahr et al. | |
| 5,479,905 A | 1/1996 | Ito | |
| 5,623,911 A | 4/1997 | Kiyomiya et al. | |
| 5,704,337 A * | 1/1998 | Stratz et al. | 123/519 |
| 5,725,016 A | 3/1998 | Nickel | |
| 5,868,119 A * | 2/1999 | Endo et al. | 123/516 |
| 5,868,120 A | 2/1999 | Van Wetten et al. | |
| 5,875,765 A | 3/1999 | Norton | |
| 6,000,426 A | 12/1999 | Tuckey et al. | |
| 6,014,958 A | 1/2000 | Miwa et al. | |
| 6,033,749 A | 3/2000 | Hata et al. | |
| 6,111,187 A | 8/2000 | Goyette | |
| 6,155,448 A | 12/2000 | Ishikawa et al. | |
| 6,182,693 B1 | 2/2001 | Stack et al. | |
| 6,274,209 B1 * | 8/2001 | Pagidas et al. | 428/35.7 |
| 6,360,729 B1 | 3/2002 | Ellsworth | |
| 6,371,089 B1 | 4/2002 | Matsuoka et al. | |
| 6,394,074 B1 | 5/2002 | Okada et al. | |
| 6,409,040 B1 | 6/2002 | Distelhoff et al. | |
| 6,446,614 B1 | 9/2002 | Matsuoka et al. | |
| 6,526,950 B2 | 3/2003 | Ito et al. | |
| 6,543,426 B1 | 4/2003 | Schwochert | |
| 6,575,146 B1 | 6/2003 | Kanai et al. | |
| 6,601,569 B2 | 8/2003 | Weldon et al. | |
| 6,616,007 B2 | 9/2003 | Ishikawa et al. | |
| 6,645,421 B1 | 11/2003 | Sanderson et al. | |
| 6,668,807 B2 | 12/2003 | Weldon et al. | |
| 2001/0007324 A1 | 7/2001 | Hagano et al. | |
| 2001/0052292 A1 | 12/2001 | Ito | |
| 2002/0000222 A1 | 1/2002 | Matsuura et al. | |
| 2002/0046739 A1 | 4/2002 | Okada et al. | |
| 2002/0051856 A1 | 5/2002 | Delbarre | |
| 2002/0112702 A1 | 8/2002 | Weldon et al. | |
| 2002/0174857 A1 | 11/2002 | Reddy et al. | |
| 2003/0089716 A1 | 5/2003 | Gerdes | |
| 2003/0121830 A1 | 7/2003 | Kuroyanagi et al. | |
| 2003/0198768 A1 | 10/2003 | Delbarre | |
| 2003/0234254 A1 | 12/2003 | Grybush et al. | |
| 2004/0052688 A1 | 3/2004 | Adema et al. | |
| 2005/0178368 A1 | 8/2005 | Donahue et al. | |
| 2006/0016436 A1 | 1/2006 | Groom et al. | |

* cited by examiner

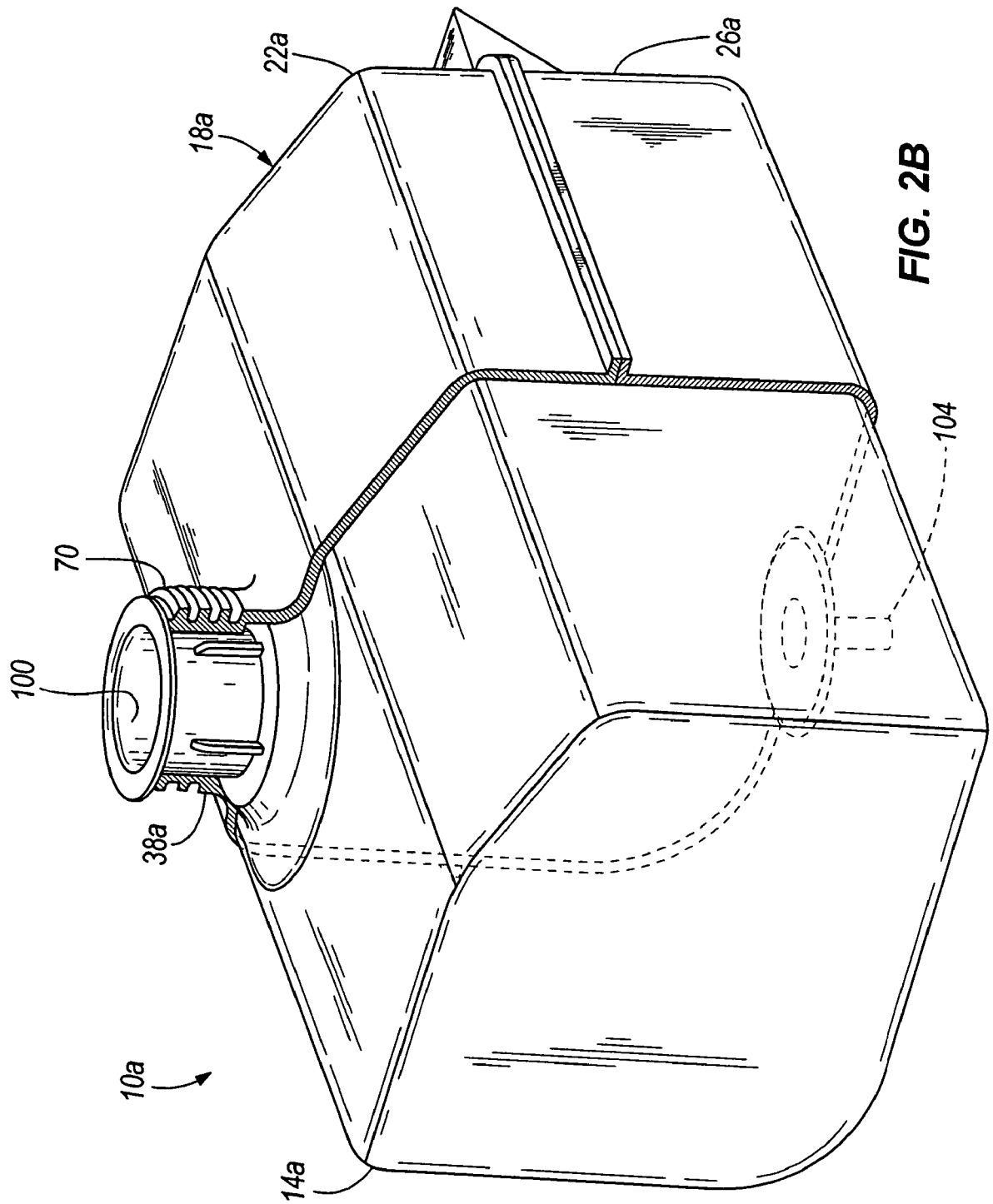

(A) ENGINE IDLE AND STATIONARY CONDITIONS (B) ENGINE NORMAL RUNNING CONDITIONS

TANK ASSEMBLY AND COMPONENTS

Cross-Reference to Related Application

This application claims the benefit of Provisional Patent Application No. 60/544,933, filed Feb. 13, 2004, the entire contents of which is hereby incorporated by reference.

FIELD OF THE INVENTION

This invention relates generally to fluid containers and, more particularly, to fuel tank assemblies and components.

SUMMARY OF THE INVENTION

As concern for the environment increases, regulations governing the prevention of the escape of vapors of volatile organic compounds ("VOC's") to the atmosphere are being promulgated by many governmental agencies. One source of VOC vapor emission is the fuel systems including the fuel tanks of automobiles and other engine-powered vehicles and devices using gasoline or other hydrocarbon fuels of high volatility.

Proposed new emissions regulations for small off-road engines, including those found in all-terrain vehicles, snowmobiles, personal watercraft and other recreational vehicles, lawn tractors and lawn mowers, and utility devices (e.g., string trimmers, chainsaws and other engine-powered cutting devices, blowers, pressure washers, pumps, and electrical generators) have necessitated development of methods of containing VOC vapor emissions from these small engines.

With current fuel system and fuel tank designs, VOC vapors can escape the fuel tank during filling and potentially be vented during use. Vapors may also escape the fuel tank through the tank wall. Carbon canisters have been used to contain VOC vapors from automotive fuel tanks. However, the engines utilized by small off-road vehicles, such as lawn tractors and lawn mowers, and utility devices are typically mounted in confined locations, such as integrated engine covers, and thereby any emissions components must be compact and relatively inexpensive in order for them to be compatible with current small engine applications. For example, when containing VOC vapor emissions in a gas-powered lawnmower or string trimmer, the engine fuel delivery components, storage components, and emissions components must be provided for in a compact and efficient array in order to meet both packaging and cost requirements for these applications.

The present invention generally provides fuel tank assemblies and components, which may reduce or prevent VOC vapor emissions and which, may substantially meet the above packaging and cost requirements. In some independent aspects, the fuel tank assemblies generally include fluid-handling structure which may substantially reduce or prevent the escape of VOC vapor emissions and protective structure enclosing the fluid-handling structure. Additionally, the fuel tank assemblies may include a fluid-handling structure that prevents the escape of VOC vapor through the walls of the fuel tank. In some independent aspects, a component of the fuel tank assembly may include adsorption media to substantially contain VOC vapor emissions in the fuel tank.

More particularly, in one independent aspect, the invention provides a fuel tank assembly generally including fluid-handling structure, such as a bladder, and protective structure enclosing the bladder. The bladder is supported in the protective structure to receive, store, and dispense fuel to a device, such as an engine. The bladder is substantially impermeable to VOC vapor and limits the vapor space above the level of fuel. The bladder may be resiliently-biased against expansion, such that the vapor space above the level of fuel in the bladder is not allowed to substantially increase with a decreasing fuel supply in the bladder.

Also, in some independent aspects, the invention provides a double-walled fuel tank assembly generally including an interior tank acting as fluid-handling structure, and an exterior tank acting as protective structure for the interior tank. The interior tank is supported by the external tank and is configured to receive, store, and dispense fuel to the engine. The interior tank is also configured to act as a barrier to substantially prevent VOC vapor emissions from escaping the interior tank.

In addition, in some independent aspects, the invention provides a multi-layered fuel tank assembly generally including an interior layer acting as fluid-handling structure, and an exterior layer acting as protective structure or as a reinforcing layer to the interior layer. The interior layer is configured to act as a barrier to substantially prevent VOC vapor emissions from escaping the interior layer.

Further, in some independent aspects, the invention provides a fuel tank assembly generally having adsorption media integrated or included with a closure component or fuel cap structure of the fuel tank assembly. In some constructions, the fuel cap structure defines a flow path between the interior and exterior of the fuel tank to which it is coupled. In a first direction of the flow path, vapor including VOC vapor emissions are routed through the adsorption media to remove the VOC vapor before the "scrubbed" vapor is discharged outside of the fuel tank.

The adsorption media traps hydrocarbons and other environmentally-harmful components comprising the VOC vapor emissions as the vapor emissions pass through the adsorption media. After a required percentage of hydrocarbons and other harmful components are removed, the "scrubbed" vapor or air is discharged outside the fuel tank.

In a second direction of the flow path opposite to the first direction, "clean" air from the exterior of the fuel tank moves to the interior of the fuel tank under action of a pressure differential (i.e., when the fuel level in the tank decreases). As the clean exterior air passes through the adsorption media, the trapped hydrocarbons and/or other harmful components may be desorbed from the adsorption media in a self-cleansing process. This cleansing process delays or prevents "saturation" of the adsorption media thereby increasing the adsorption media's ability to adsorb additional VOC vapor emissions and extending the useful life of the adsorption media. In some constructions of the closure component or fuel cap incorporating the adsorption media, forced convection may be used to establish a flow through the adsorption media to more effectively desorb the trapped hydrocarbons and/or other harmful components from the adsorption media.

Also, in some independent aspects, the invention provides a fuel tank assembly generally having adsorption media integrated or included with a portion of the fuel tank. The fuel tank may include a receptacle or cavity located in the interior of the fuel tank. Adsorption media, which may be in canister form, is insertable in the receptacle or cavity.

The canister and fuel tank structure may define one or more flow paths between the interior and exterior of the fuel tank. In a first flow path, for example, vapor including VOC vapor emissions may be routed from the fuel tank, into the canister, and through the adsorption media to remove the VOC vapor before the "scrubbed" vapor is combined with a fresh air source and discharged outside of the canister to the environment or an intake portion of an engine. In a second flow path, for example, filtered air from the exterior of the fuel tank may be moved into the canister, through the adsorption media, and into the fuel tank under action of a pressure differential (i.e., when the fuel level in the tank decreases). As the clean exterior air passes through the adsorption media, the trapped hydrocarbons and/or other harmful components may be desorbed from the adsorption media in a self-cleansing process. This cleansing process delays or prevents "saturation" of the adsorption media thereby increasing the adsorption media's ability to adsorb additional VOC vapor emissions and extending the useful life of the adsorption media. The adsorption media may also be replaceable. In some constructions of the canister incorporating the adsorption media, forced convection may be used to establish a flow through the adsorption media to more effectively desorb the trapped hydrocarbons and/or other harmful components from the adsorption media.

In addition, in some independent aspects, the invention provides a fuel tank assembly generally having adsorption media integrated or included with a component of the fuel system remotely positioned from the fuel tank. The remotely-positioned component may comprise a canister containing the adsorption media.

The canister and fuel tank structure may define one or more flow paths between the interior and exterior of the fuel tank. In a first flow path, for example, vapor including VOC vapor emissions may be routed from the fuel tank, into the canister, and through the adsorption media to remove the VOC vapor before the "scrubbed" vapor is discharged outside of the canister to the environment or an intake portion of an engine. In a second flow path, for example, clean air from the exterior of the fuel tank may be moved into the canister, through the adsorption media, and into the fuel tank under action of a pressure differential (i.e., when the fuel level in the tank decreases). As the clean exterior air passes through the adsorption media, the trapped hydrocarbons and/or other harmful components may be desorbed from the adsorption media in a self-cleansing process. This cleansing process delays or prevents "saturation" of the adsorption media thereby increasing the adsorption media's ability to adsorb additional VOC vapor emissions and extending the useful life of the adsorption media. The adsorption media may also be replaceable. In some constructions of the canister incorporating the adsorption media, forced convection may be used to establish a flow through the adsorption media to more effectively desorb the trapped hydrocarbons and/or other harmful components from the adsorption media.

Independent features and independent advantages of the present invention will become apparent to those skilled in the art upon review of the following detailed description, claims and drawings.

BRIEF DESCRIPTION OF THE DRAWINGS

FIG. 2b is a cutaway view of the fuel tank assembly of FIG. 2a.

FIG. 3b is a section view of another construction of the fuel tank assembly of FIG. 3a.

FIG. 6 is a section view of a canister portion of the closure component of FIG. 5a.

FIG. 7d is a section view of another construction of the fuel tank assembly of FIG. 7a.

Figure 1:
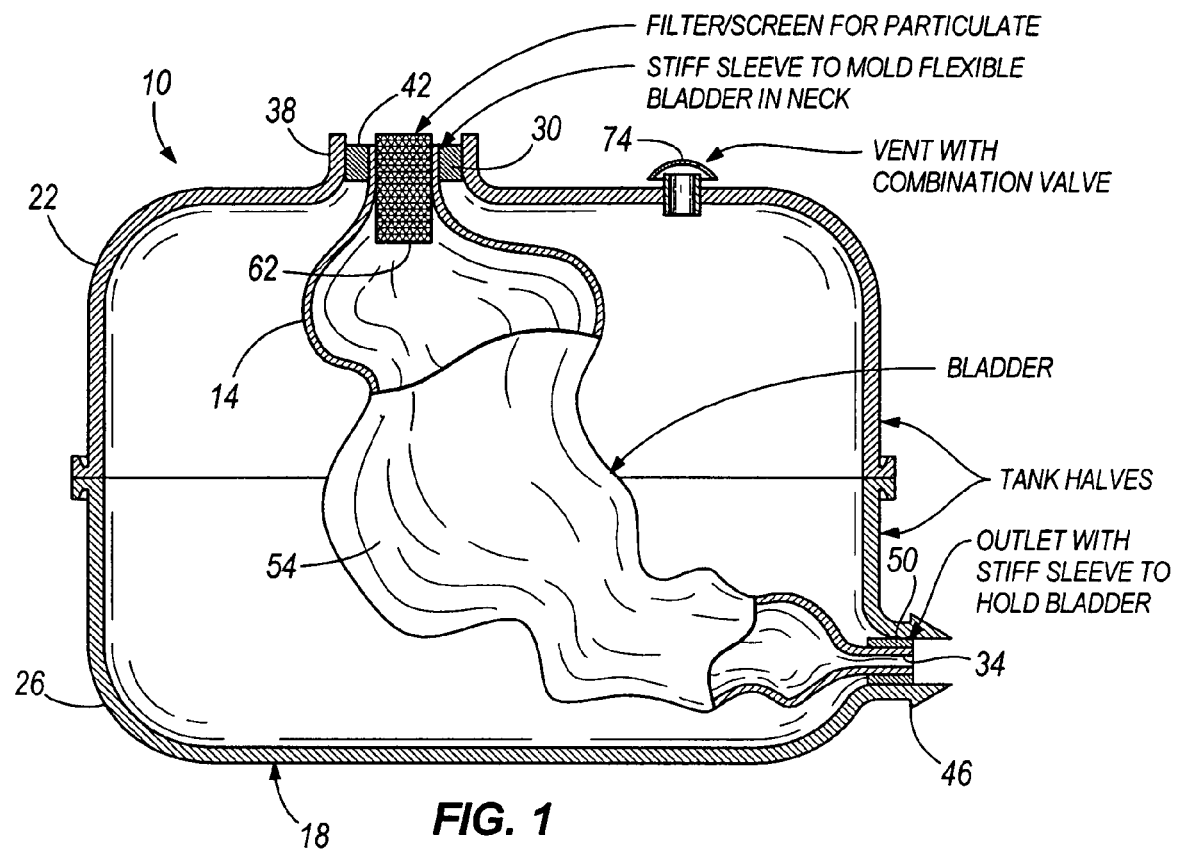
FIG. 1 is a section view of a fuel tank assembly embodying independent aspects of the invention, illustrating a bladder enclosed by a protective structure.

Before any embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIG. 1 illustrates a fuel tank assembly 10 embodying independent aspects of the invention. The fuel tank assembly 10 includes a fuel-handling structure, for example, in the form of a bladder 14, and a protective structure or shell 18 surrounding and enclosing the bladder 14. In the illustrated construction, the shell 18 is in the form of mating upper and lower tank shells 22, 26. Together, the shells 22, 26 provide a substantially rigid and protective exterior tank.

The bladder 14 is configured to store the fuel and includes an inlet 30, through which fuel is introduced into the bladder 14, and an outlet 34, through which fuel is discharged from the bladder 14. As shown in FIG. 1, the bladder inlet 30 is supported in an inlet portion 38 of the upper tank shell 22. In the illustrated construction, the bladder inlet 30 is supported in the inlet portion 38 of the upper tank shell 22 by a substantially stiff grommet or sleeve 42. As shown in FIG. 1, the sleeve 42 is sealed to the bladder 14 by a process, such as, for example, heat sealing or ultrasonic welding, and is snap-fit into the inlet portion 38 of the upper tank shell 22 to secure the bladder inlet 30 to the upper tank shell 22. However, in other constructions of the fuel tank assembly 10, the bladder inlet 30 may be secured to the upper tank shell 22 in any of a number of different ways (e.g., by pressing, welding, adhering, bonding, etc.), as long as fuel may be introduced into the bladder 14 via the inlet portion 38 of the upper tank shell 22.

With continued reference to FIG. 1, the bladder outlet 34 is shown supported in an outlet portion 46 of the lower tank shell 26. In the illustrated construction, the bladder outlet 34, in a manner similar to the bladder inlet 30, is supported in the outlet portion 46 of the lower tank shell 26 by another substantially stiff grommet or sleeve 50. As shown in FIG. 1, the sleeve 50 is sealed to the bladder 14 by a process, such as, for example, heat sealing or ultrasonic welding, and is snap-fit into the outlet portion 46 of the lower tank shell 26 to secure the bladder outlet 34 to the lower tank shell 26. However, in other constructions of the fuel tank assembly 10, the bladder outlet 34 may be secured to the lower tank shell 26 in any of a number of different ways (e.g., by pressing, welding, adhering, bonding, etc.), as long as fuel may be discharged from the bladder 14 via the outlet portion 46 of the lower tank shell 26. A conventional flexible or rigid supply conduit (not shown) may be coupled (e.g., by a snap-fit) to the outlet portion 46 of the lower tank shell 26 to fluidly connect the bladder 14 with an engine (not shown).

Generally, the bladder 14 limits the vapor space above the level of stored fuel to limit the production of VOC vapor emissions from the fuel. In some constructions and in some aspects, the bladder 14 may be resiliently biased against expansion, such that the vapor space above the level of the stored fuel in the bladder 14 is not allowed to substantially increase with a decreasing fuel supply in the bladder 14. In other words, the bladder 14 is constricted to reduce the air volume in the bladder 14 or the vapor space above the level of stored fuel, as fuel is discharged from the bladder outlet 34. By reducing the air volume in the bladder 14 when fuel is discharged from the bladder outlet 34, the pressure in the fuel system is substantially equalized. Therefore, it should no longer be required to vent the vapor space to atmospheric pressure.

Also, by reducing the air volume in the bladder 14, less space is available in the bladder 14 for the build-up of VOC vapor emissions. Therefore, the probability of VOC vapor developing and environmentally harmful VOC vapor emissions escaping from the fuel tank assembly 10 is decreased, when compared to a conventional fuel tank assembly which does not include a bladder 14 or a biased bladder 14.

In some constructions of the fuel tank assembly 10, biasing force on the bladder 14 may be externally applied to the bladder 14. For example, the fuel tank assembly 10 may utilize an elastomeric web or net 54 to surround the bladder 14 and externally apply the constricting, biasing force to the bladder 14. In other constructions, the fuel tank assembly 10 may utilize elastomeric foam 58 (see FIG. 2a) that surrounds the bladder 14 and applies a compression or constricting force on the bladder 14. The elastomeric foam 58 may be used to limit the amount of space for vapor to accumulate in the bladder 14 as fuel is being consumed. In yet other constructions, the fuel tank assembly 10 may utilize a system of resilient fingers or mechanical springs to apply the constricting, biasing force to the bladder 14. In other constructions, the biasing force may be provided by the bladder 14. For example, a resilient material may be included in or incorporated into the material of the bladder 14 during manufacturing, which could allow the bladder 14 to constrict without the use of separate elastomeric devices.

As shown in FIG. 1, the fuel tank assembly 10 also includes a filter member 62 coupled to the bladder inlet 30. In one construction, the filter member 62 may include a coarse configuration to substantially prevent the fill nozzle of a gas can or hose, for example, from contacting and potentially damaging the bladder 14. In another construction, the filter member 62 may include a mesh or screen material to trap physical contaminants and impurities in fuel being poured into the bladder 14. Alternatively, both types of filter members may be utilized in the bladder inlet 30. The filter member 62 may be coupled to the bladder in any of a number of ways (e.g., heat sealing, pressing, welding, adhering, bonding, etc.), or the filter member 62 may be coupled to a closure device 66 (see FIG. 2a) configured to close the open end of the inlet portion 38 of the upper tank shell 22. The bladder outlet 34 may also include a filter member (like that shown in FIG. 3b) containing mesh material for trapping physical contaminants and impurities in fuel being discharged from the outlet portion 46 of the lower tank shell 26.

Figure 5A:
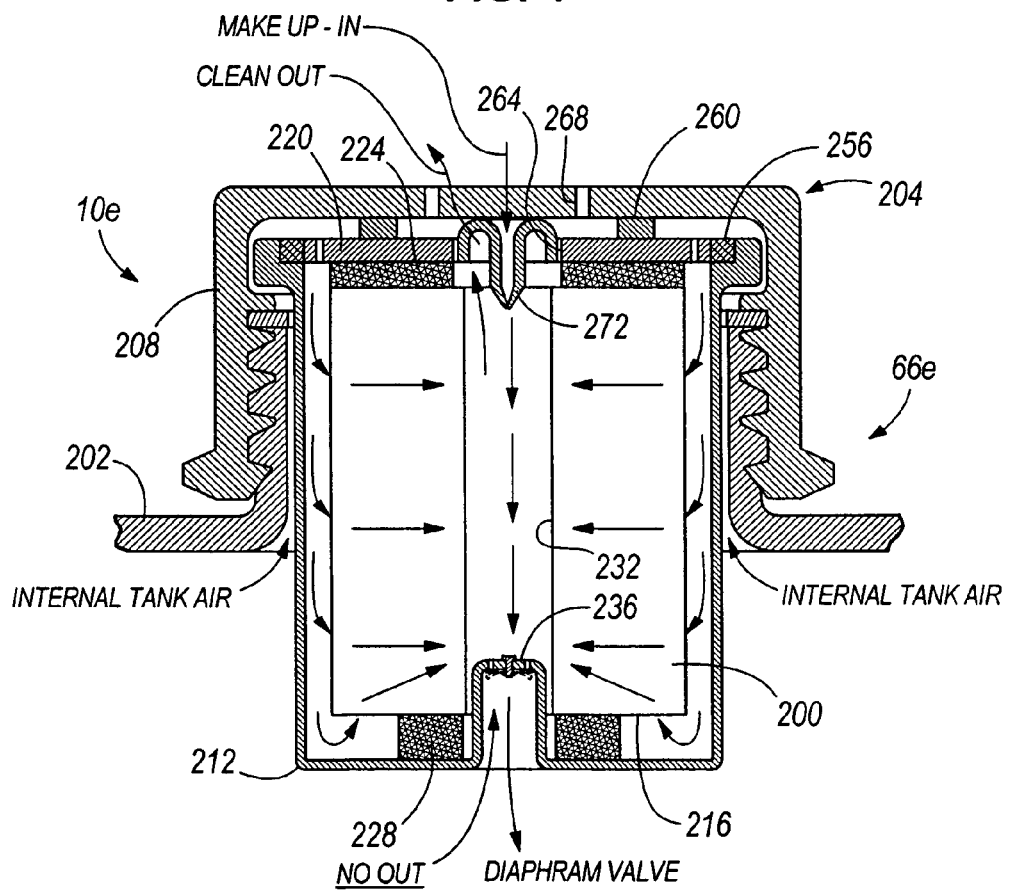
FIG. 5a is a section view of another fuel tank assembly embodying independent aspects of the invention, illustrating adsorption media integral or molded with a closure component of the fuel tank assembly.

The inlet portion 38 of the upper tank shell 22 includes a threaded finish 70 to receive the closure device 66, which has a matching threaded finish. The closure device 66 may include a conventional fuel cap, for example. However, the closure device 66 may also include a fuel cap having a filter member (which may or may not be the same as the filter member 62 discussed above) or a "VOC filter" member configured to vent vapor pressure accumulated in the bladder 14 while preventing VOC vapor emissions from being released outside the fuel tank assembly 10. Such a closure device having the "VOC filter" member is shown in FIG. 5a and is discussed in more detail below.

As shown in FIG. 1, the fuel tank assembly 10 also includes a vent 74 with combination valve coupled to the upper tank shell 22. The vent 74 is configured to provide atmospheric pressure to the outside of the bladder 14. As a result, the pressure acting on the walls of the shell 18 may be substantially equalized.

The assembly or manufacture of the fuel tank assembly 10 may be carried out in any of a number of different ways. However, in the illustrated construction, by initially providing the shell 18 as separate shells 22, 26, the assembly of the fuel tank assembly 10 may be simplified somewhat. The bladder inlet 30 may first be snap-fit into the inlet portion 38 of the upper tank shell 22 using the sleeve 42 or an equivalent locking device. In addition, the bladder inlet 30 may be alternately secured to the upper tank shell 22 by, for example, pressing, welding, adhering, or bonding the bladder inlet 30 to the inlet portion 38 of the upper tank shell 22.

In continuing the assembly process, the lower tank shell 26 is mated with and preferably permanently connected to the upper tank shell 22 by, for example, a welding process such as hot-plate welding, vibration welding, laser welding, or ultrasonic welding. Alternatively, the upper and lower tank shells 22, 26 may be connected using snap-fits, press-fits, adhesives, or bonding agents.

After the shells 22, 26 are connected, the bladder outlet 34 may be grasped and pulled through the outlet portion 46 of the lower tank shell 26, and the bladder outlet 34 may be snap-fit into the outlet portion 46 of the lower tank shell 26 using the sleeve 50 or an equivalent locking device. A tether (not shown) may be attached to or molded as a part of the bladder outlet 34 to be used in pulling the bladder outlet 34 through the outlet portion 46, or a specialized tool may be provided to retrieve the bladder outlet 34 from the interior of the shell 18. In addition, the bladder outlet 34 may be alternately secured to the lower tank shell 26 by, for example, pressing, welding, adhering, or bonding the bladder outlet 34 to the outlet portion 46 of the lower tank shell 26.

In other constructions, the bladder 14 may not include a bladder inlet 30, and the upper tank shell 22 may not include an inlet portion 38. Rather, the bladder 14 may be filled with a fixed amount of fuel and may not be refillable after the fuel is depleted from the bladder 14. Such a construction may be conceptually like a "wine-in-a-bag" beverage product, such that the entire fuel tank assembly 10 must be replaced each time the associated bladder 14 is depleted of its fuel.

Furthermore, in yet other constructions, the shell 18 may be openable, such that a bladder 14 may be removed and replaced with another bladder 14. In some constructions, the shell 18 may be openable along the intersection of the upper and lower tank shells 22, 26, and, in other constructions, the shell 18 may include a door through which an operator may gain access to the bladder 14. In such constructions, the bladder outlet 34 is removably connectable to the outlet portion 46 of the lower tank shell 26 and/or to the supply conduit. Also, in such constructions, an empty non-refillable bladder 14 may be replaced with a bladder 14 full of fuel.

In providing the upper and lower tank shells 22, 26, the shells 22, 26 may be manufactured in any of a number of different ways. By way of example only, the shells 22, 26 may be manufactured using an injection molding process. Also, the shells 22, 26 are preferably substantially rigid to provide structural protection and/or reinforcement to the bladder 14. Further, the shells 22, 26 should preferably provide UV-protection to the bladder 14 and fuel by not allowing ultraviolet ("UV") light to pass therethrough. To satisfy these requirements, the shells 22, 26 may be manufactured using an appropriate plastic material, such as, for example, high-density polyethylene ("HDPE"). Alternatively, other substantially rigid and/or UV-blocking materials may be utilized in forming the shells 22, 26.

In providing the bladder 14, the bladder 14 may be manufactured using at least one layer of a low-permeability barrier material. For example, the bladder 14 may be made of a low-permeability fluoropolymer barrier material. In addition, the sleeve 42 securing the bladder inlet 30 in the inlet portion 38 of the upper tank shell 22, and sleeve 50 securing the bladder outlet 34 in the outlet portion 46 of the lower tank shell 26, may be made from a low-permeability barrier material. For example the sleeve 50 may be made of an injection-molded grade of low-permeability fluoropolymer barrier material.

In an exemplary manufacturing process, the bladder 14 is formed from two injection-molded halves of barrier material that are heat-sealed together. The two halves of barrier material may be sealed together such that the seam between the two halves of barrier material is substantially leak-proof and substantially prevents the escape of VOC vapor emissions therethrough. Further, the bladder inlet 30 and the bladder outlet 34 may be heat-sealed to one or both of the two halves of barrier material such that the seams with the bladder inlet 30 and the bladder outlet 34 are substantially leak-proof and substantially prevents the escape of VOC vapor emissions therethrough. In addition to heat-sealing, any of a number of welding processes, such as, for example, hot-plate welding, vibration welding, laser welding, or ultrasonic welding, may be used provided that the resulting bladder 14 is fluid-tight and the liquid fuel is not allowed to leak from the bladder 14.

In another exemplary process, a single sheet of barrier material may be formed into the bladder 14. This may reduce the length of the outer seam in the bladder 14.

In the illustrated construction, the bladder 14 is made from a monolayer fluoropolymer as thin as about 0.003" to 0.005." However, the thickness of the bladder 14 may be increased to about 0.010" to improve the tear resistance characteristics of the bladder 14.

In other constructions, the bladder 14 may be made from a multi-layer arrangement, in which the low-permeability layer serves as the barrier layer, and other layer(s) may serve as reinforcement layer(s) to the barrier layer. Such a multi-layer arrangement may be manufactured by a blow-molding process. The low-permeability material allows the bladder 14 to substantially contain any VOC vapor emissions emanating from the fuel and prevents the VOC vapor emissions from escaping from the bladder 14.

In forming the bladder 14, such a low-permeability material, by way of example only, includes a liquid crystal polymer ("LCP"). Such an LCP may include Zenite® LCP, produced by E.I. du Pont de Nemours and Company, and XYDAR® LCP, produced by Solvay Advanced Polymers. Other LCP materials may also be used.

FIGS. 2a-2e illustrate another construction of a fuel tank assembly 10a similar to the fuel tank assembly 10 of FIG. 1. Common elements are identified with like reference numerals "a."

The fuel tank assembly 10a includes a fuel-handling structure, for example, in the form of a bladder 14a, and a protective structure or shell 18a surrounding and enclosing the bladder 14a. In the illustrated construction, the shell 18a is in the form of mating upper and lower tank shells 22a, 26a. Together, the shells 22a, 26a provide a substantially rigid, exterior tank.

The bladder 14a is formed from two halves of barrier material like the bladder 14 of FIG. 1. However, the bladder 14a includes a bladder inlet 100 and a bladder outlet 104 separate from and coupled to the halves of barrier material. The bladder inlet 100 may be coupled to an upper half, for example, of barrier material, and the bladder outlet 104 may be coupled to a lower half of barrier material. Alternatively, the halves of barrier material may be joined such that both the bladder inlet and outlet 100, 104 are coupled to both halves of barrier material. The bladder inlet and outlet 100, 104 may be made from a similar barrier material as the halves of barrier material, such that the bladder inlet and outlet 100, 104 may be heat-sealed to the halves of barrier material. Alternatively, a welding process such as hot-plate welding, vibration welding, laser welding, or ultrasonic welding may be used to couple the bladder inlet and outlet 100, 104 to the halves of barrier material.

Figure 2A:
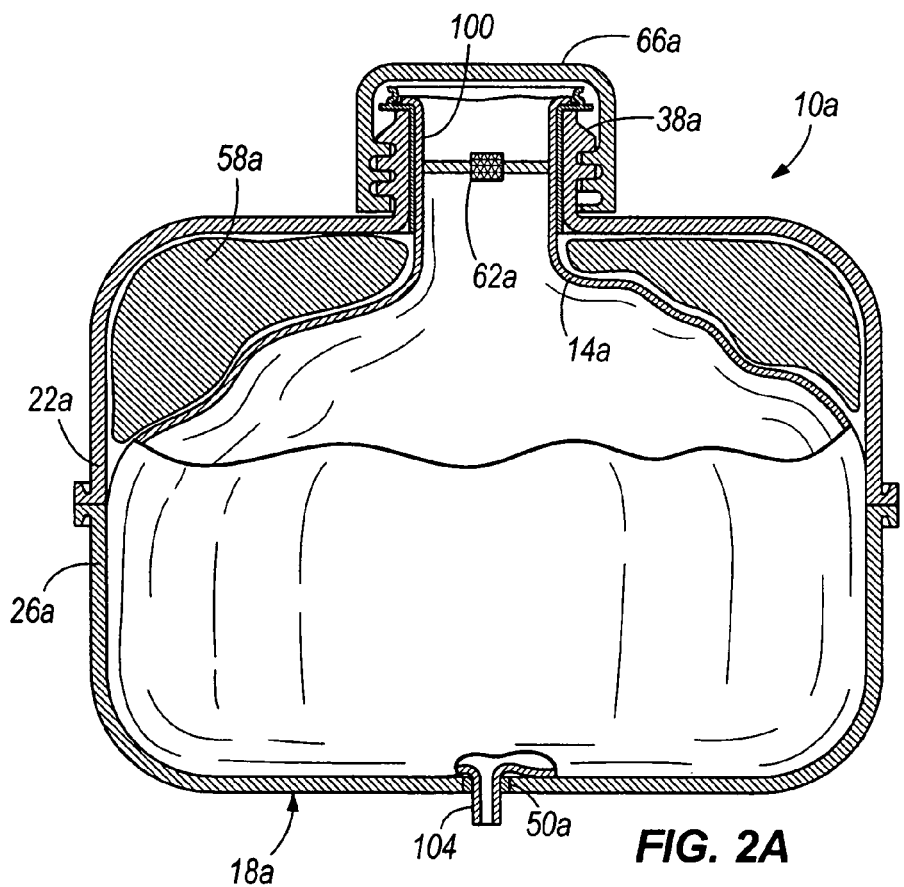
FIG. 2a is a section view of another construction of the fuel tank assembly of FIG. 1.
Figure 2C:
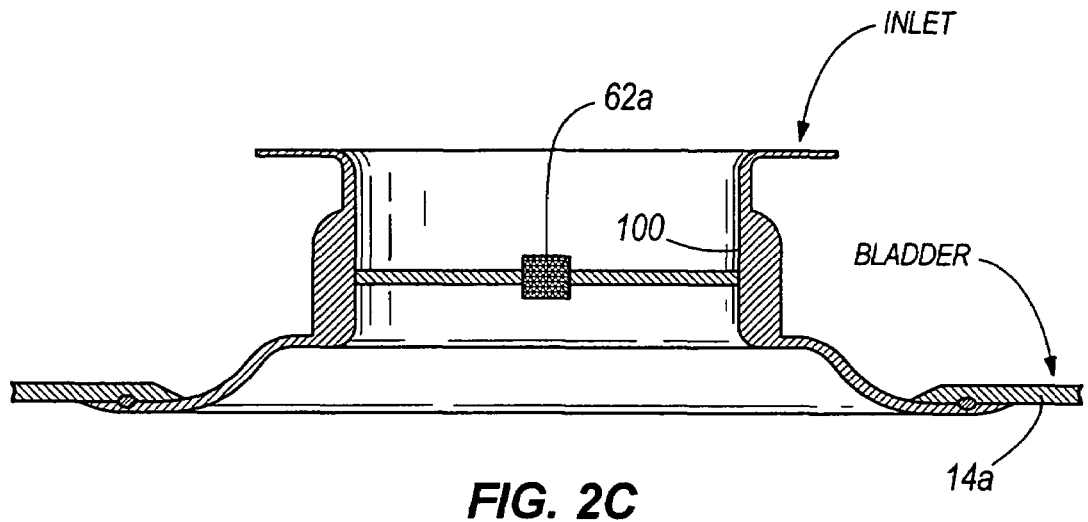
FIG. 2c is an enlarged section view of a portion of the fuel tank assembly of FIG. 2b, illustrating a fuel inlet.

As shown in FIG. 2b, the bladder inlet 100 is supported in an inlet portion 38a of the upper tank shell 22a. In the illustrated construction, the bladder inlet 100 is snap-fit into the inlet portion 38a of the upper tank shell 22a to secure the bladder inlet 100 to the upper tank shell 22a. As shown in FIG. 2e, the bladder outlet 104 is inserted through an aperture 108 formed in the lower tank shell 26a. In the illustrated construction, the bladder outlet 104 is supported in the aperture 108 by a substantially stiff grommet or sleeve 50a. In some constructions, the sleeve 50a may be sealed to the bladder 14a, for example, by a process such as heat sealing or ultrasonic welding, and engageable with the aperture 108 in the lower tank shell 26*a* to secure the bladder outlet 104 with respect to the lower tank shell 26*a*. Alternatively, in other constructions, the sleeve 50*a* may be integral with or sealed to the outer tank shell 26*a*.

Similar to the fuel tank assembly 10 of FIG. 1, the fuel tank assembly 10*a* may utilize elastomeric foam 58*a* to apply a force to the bladder 14*a* to reduce the vapor space inside the bladder 14*a*. However, as shown in FIG. 2*a*, the foam 58*a* is positioned above the bladder 14*a* rather than surrounding the bladder 14*a*. As fuel empties from the bladder 14*a*, the foam 58*a* is allowed to expand and displace the empty portions of the bladder 14*a* to decrease the vapor space in the bladder 14*a*. When the bladder 14*a* is refilled with fuel, the foam 58*a* is compressed to accommodate the expanding bladder 14*a* in the shell 18*a*.

Figure 2D:
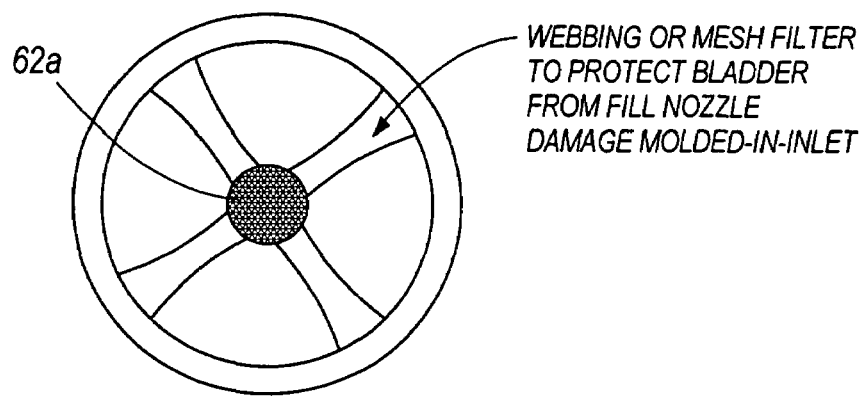
FIG. 2d is a top view of the fuel inlet of FIG. 2c.
Figure 2E:
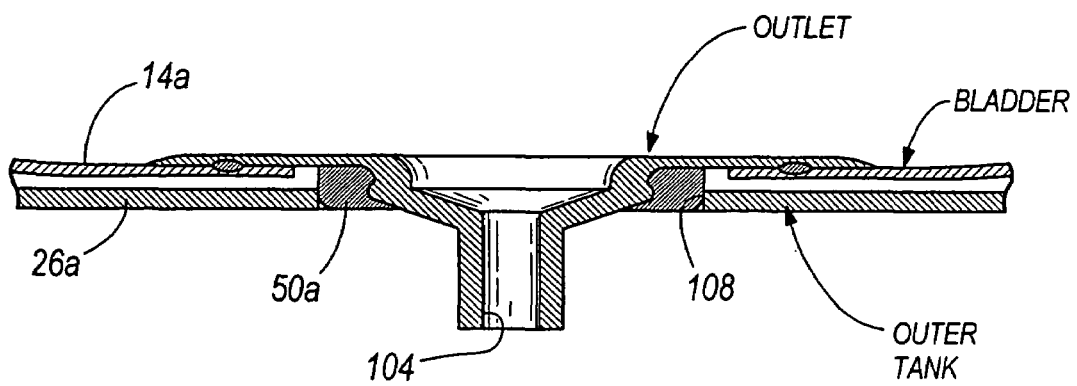
FIG. 2e is an enlarged section view of a portion of the fuel tank assembly of FIG. 2b, illustrating a fuel outlet.

With reference to FIG. 2*d*, a filter member 62*a* is located in the bladder inlet 100 to substantially prevent the fill nozzle of a gas can or hose, for example, from contacting and potentially damaging the bladder 14*a*. In the illustrated construction, the filter member 62*a* is integrally formed with the bladder inlet 100 via any of a number of conventional molding processes. Alternatively, the filter member 62*a* may be formed as a separate and distinct component from the bladder inlet 100 and coupled to the bladder inlet 100. The filter member 62*a* may be connected to the bladder inlet 100 by any of a number of different methods (e.g., heat sealing, welding, press-fitting, snap-fitting, etc.). In addition to the filter member 62*a*, an additional mesh filter (not shown) may be utilized downstream of the filter member 62*a* to substantially prevent particulate matter and/or contaminants in the fuel from entering the bladder 14*a*.

Figure 3A:
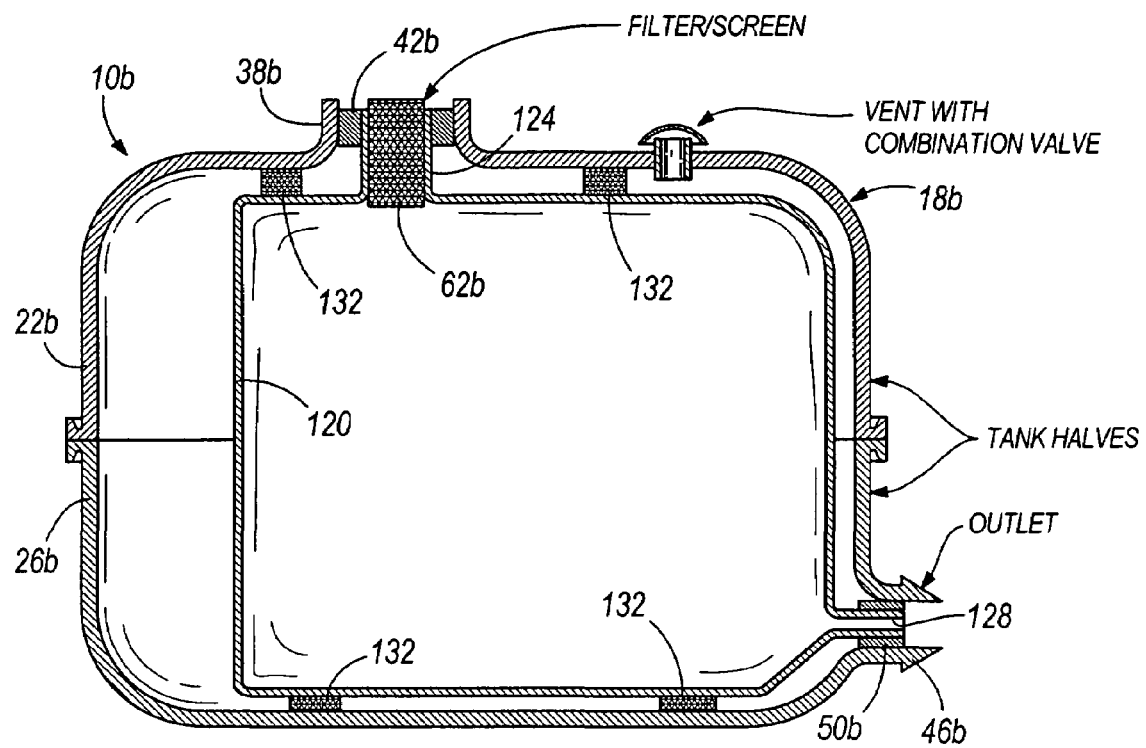
FIG. 3a is a section view of another fuel tank assembly embodying independent aspects of the invention, illustrating an interior tank supported within an exterior tank.

FIG. 3*a* illustrates another fuel tank assembly 10*b* embodying independent aspects of the invention. The fuel tank assembly 10*b* is similar to the fuel tank assemblies 10, 10*a* of FIGS. 1-2*e*, such that common elements are labeled with like reference numerals "b."

The fuel tank assembly 10*b* generally includes an interior tank 120 acting as a fluid-handling structure, and a shell 18*b* acting as a protective structure or exterior tank for the interior tank 120. The interior tank 120 is configured to receive fuel via an interior tank inlet 124, store the fuel, and discharge the fuel to the engine via an interior tank outlet 128. The interior tank 120 may be configured to be substantially more rigid than the bladders 14, 14*a* of FIGS. 1-2*e*. As a result, the interior tank 120 may not be biased or constricted like the bladder 14, 14*a* upon fuel discharge.

The interior tank 120 may also be supported by the shell 18*b* via one or more supports 132 extending between the shell 18*b* and the interior tank 120. The supports 132 may be separate pieces coupled to the shell 18*b* and interior tank 120, or the supports 132 may be integrally formed with one of the shell 18*b* and interior tank 120 for coupling with the other. The supports 132 may be configured as upright members, such that the lower tank shell 26*b* bears the weight of the interior tank 120 and any fuel stored in the interior tank 120. The supports 132 may also be configured as shock absorbers to cushion the interior tank 120 from intermittent shock forces.

The assembly or manufacture of the fuel tank assembly 10*b* may be carried out in a similar fashion as the fuel tank assemblies 10, 10*a* of FIGS. 1-2*e*. In assembling the fuel tank assembly 10*b*, the upper tank shell 22*b* and the interior tank 120 are provided, and the interior tank inlet 124 may first be snap-fit into the inlet portion 38*b* of the upper tank shell 22*b* using a sleeve 42*b* or an equivalent locking device. Alternatively, the interior tank inlet 124 may be secured to the upper tank shell 22*b* by, for example, pressing, welding, adhering, or bonding the interior tank inlet 124 to the inlet portion 38*b* of the upper tank shell 22*b*.

In continuing the assembly process, the lower tank shell 26*b* is provided, and the interior tank outlet 128 may be inserted through the outlet portion 46*b* of the lower tank shell 26*b* and snap-fit using another sleeve 50*b* or an equivalent locking device. In addition, the interior tank outlet 128 may be alternately secured to the lower tank shell 26*b* by, for example, pressing, welding, adhering, or bonding the interior tank outlet 128 to the outlet portion 46*b* of the lower tank shell 26*b*. In addition, if the supports 132 are configured as separate pieces with respect to the interior tank 120 and shell 18*b*, the supports 132 are positioned in place before the final assembly of the upper and lower tank shells 22*b*, 26*b*.

The upper and lower tank shells 22*b*, 26*b* may be substantially similar in their structure, manufacture, and assembly to those upper and lower tank shells 22, 22*a*, 26, 26*a* previously described and shown in FIGS. 1-2*e*.

In providing the interior tank 120, the interior tank 120 may be manufactured using an injection molding process such that the wall thickness of the interior tank 120 is larger compared to the wall thickness of the bladder 14, 14*a*. The wall thickness of the interior tank 120 is sufficiently large such that the interior tank 120 maintains its shape, as opposed to the relatively thin wall thickness of the bladder 14, 14*a*, which does not maintain its shape.

In the illustrated construction, the interior tank 120 is made from a low-permeability monolayer fluoropolymer having a thickness as low as about 0.020" and as high as about 0.160". In other constructions, the interior tank 120 may be made from a multi-layer arrangement, in which a low-permeability layer serves as a "barrier" layer, and other surrounding layer(s) may serve as reinforcement layer(s) to the barrier layer. The low-permeability material allows the interior tank 120 to substantially contain any VOC vapor emissions emanating from the fuel and prevents the VOC vapor emissions from escaping the interior tank 120.

FIGS. 3*b*-3*f* illustrate another construction of a fuel tank assembly 10*c* similar to the fuel tank assemblies 10, 10*a*, 10*b* of FIGS. 1-3*a*. Common elements are identified with like reference numerals "c."

Figure 3B:
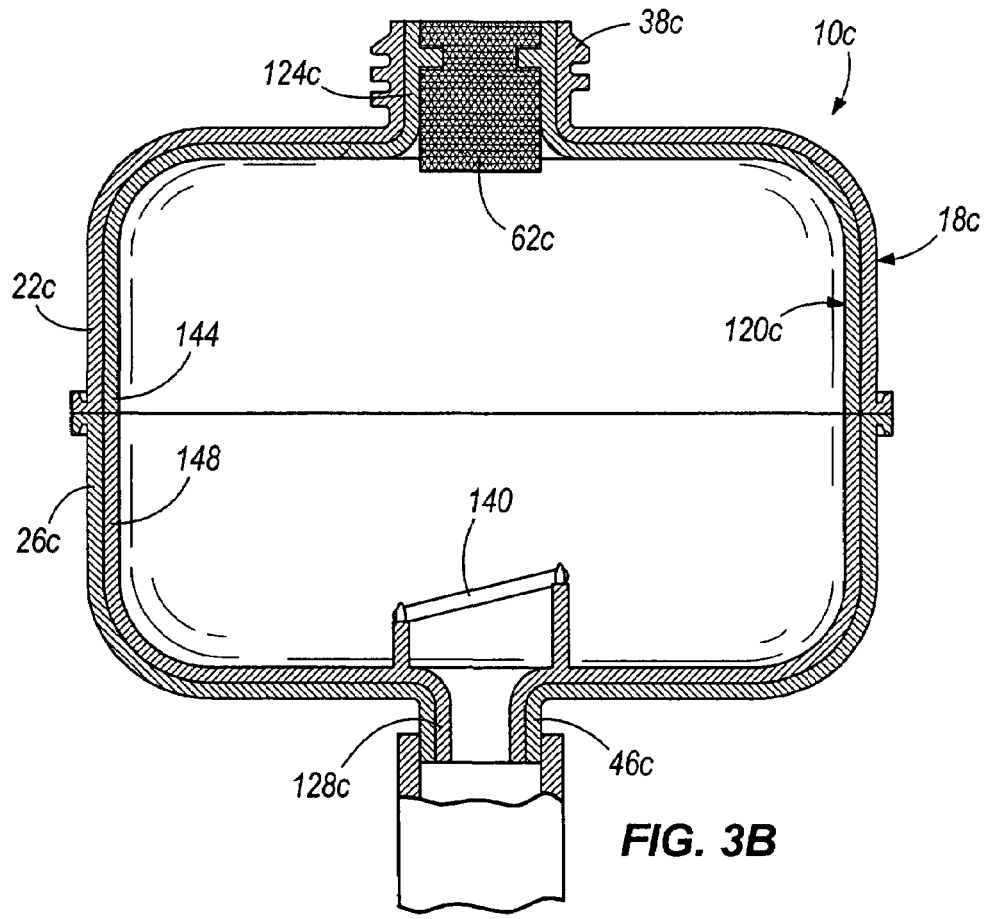

With reference to FIG. 3*b*, the fuel tank assembly 10*c* generally includes an interior tank 120*c* acting as a fluid-handling structure, and a shell 18*c* acting as a protective structure for the interior tank 120*c*. The interior tank 120*c* is substantially similar to the interior tank 120 of FIG. 3*a*, however, the interior tank 120*c* is configured as a substrate to be overmolded by the shell 18*c* rather than as a tank suspended in the shell 18*c*.

Figure 3C:
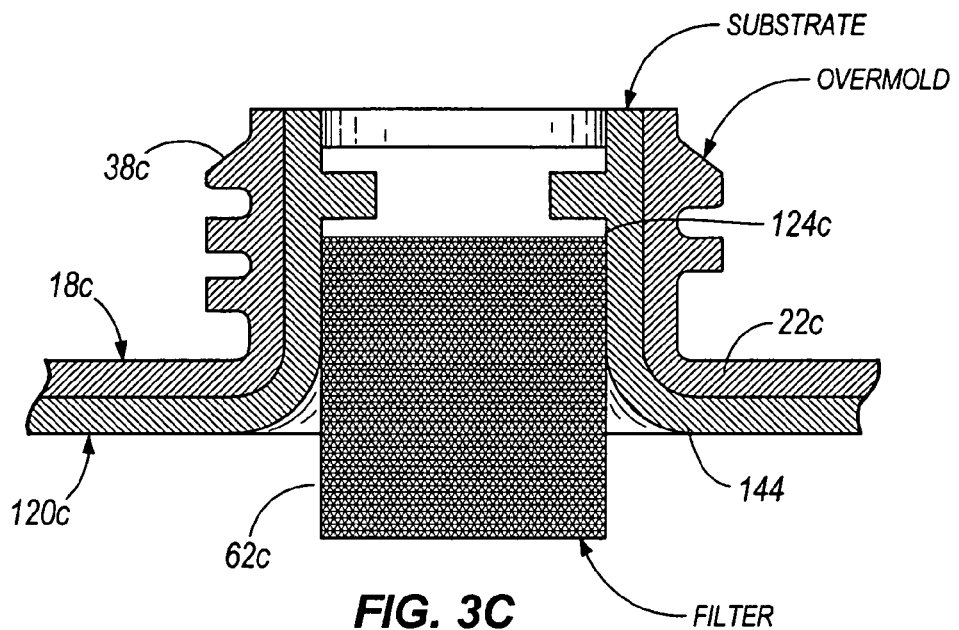
FIG. 3c is an enlarged section view of a portion of the fuel tank assembly of FIG. 3b, illustrating a fuel inlet.
Figure 3D:
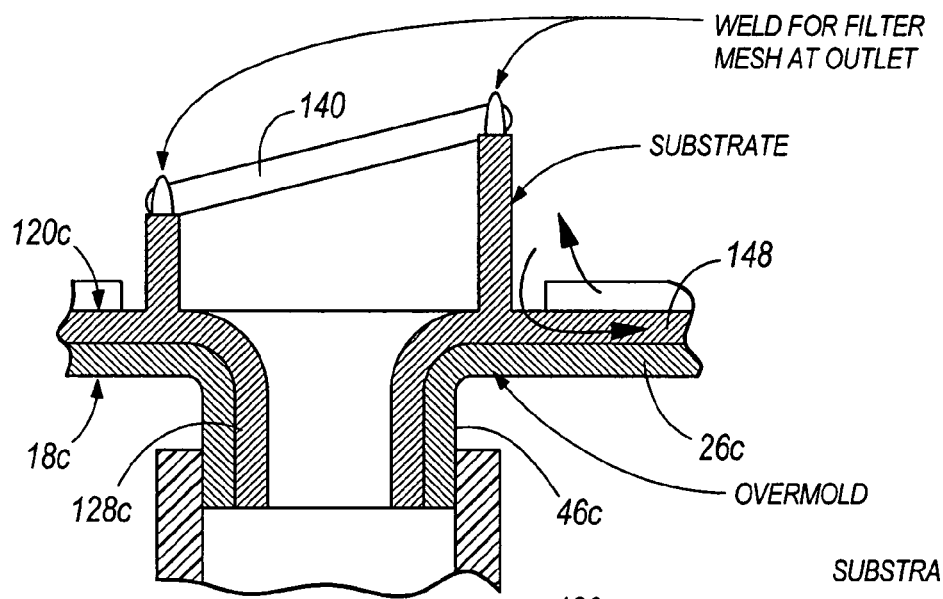
FIG. 3d is an enlarged section view of a portion of the fuel tank assembly of FIG. 3b, illustrating a fuel filter covering a fuel outlet.
Figure 3E:
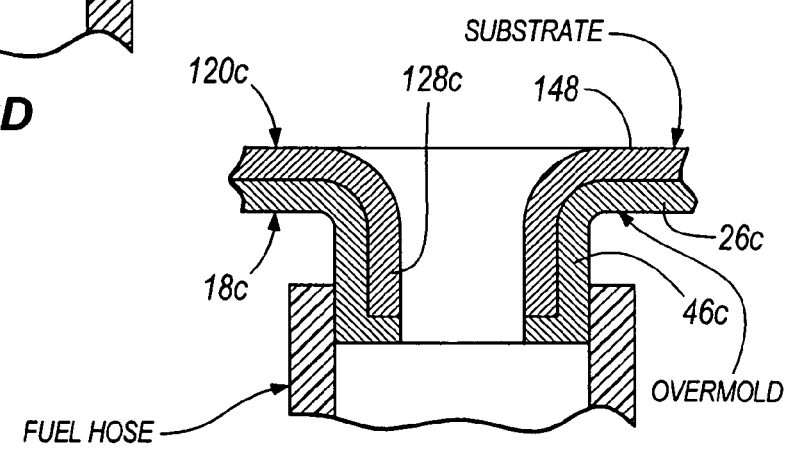
FIG. 3e is an enlarged section view of a portion of the fuel tank assembly of FIG. 3b, illustrating a fuel discharge hose connected to a fuel outlet.

With reference to FIG. 3*c*, an interior tank inlet 124*c* is overmolded by an inlet portion 38*c* of the upper tank shell 22*c*. Likewise, as shown in FIGS. 3*d*-3*e*, an interior tank outlet 128*c* is overmolded by an outlet portion 46*c* of the lower tank shell 26*c*. A filter member 62*c* is positioned in the interior tank inlet 124*c* like the previously-described filter members 62, 62*a*, 62*b*. In addition, another filter member 140 may be positioned in or adjacent the interior tank outlet 128 to substantially prevent contaminants in the fuel from leaving the interior tank 120*c*.

The assembly or manufacture of the fuel tank assembly 10*c* may be carried out by first providing injection molded upper and lower halves 144, 148 of the interior tank 120*c*. Then, the upper and lower halves 144, 148 of the interior tank 120*c* may be placed into respective molds to insert mold, or overmold, the upper and lower halves 144, 148 of the interior tank 120*c*, thereby forming the upper and lower tank shells 22*c*, 26*c*.

Figure 3F:
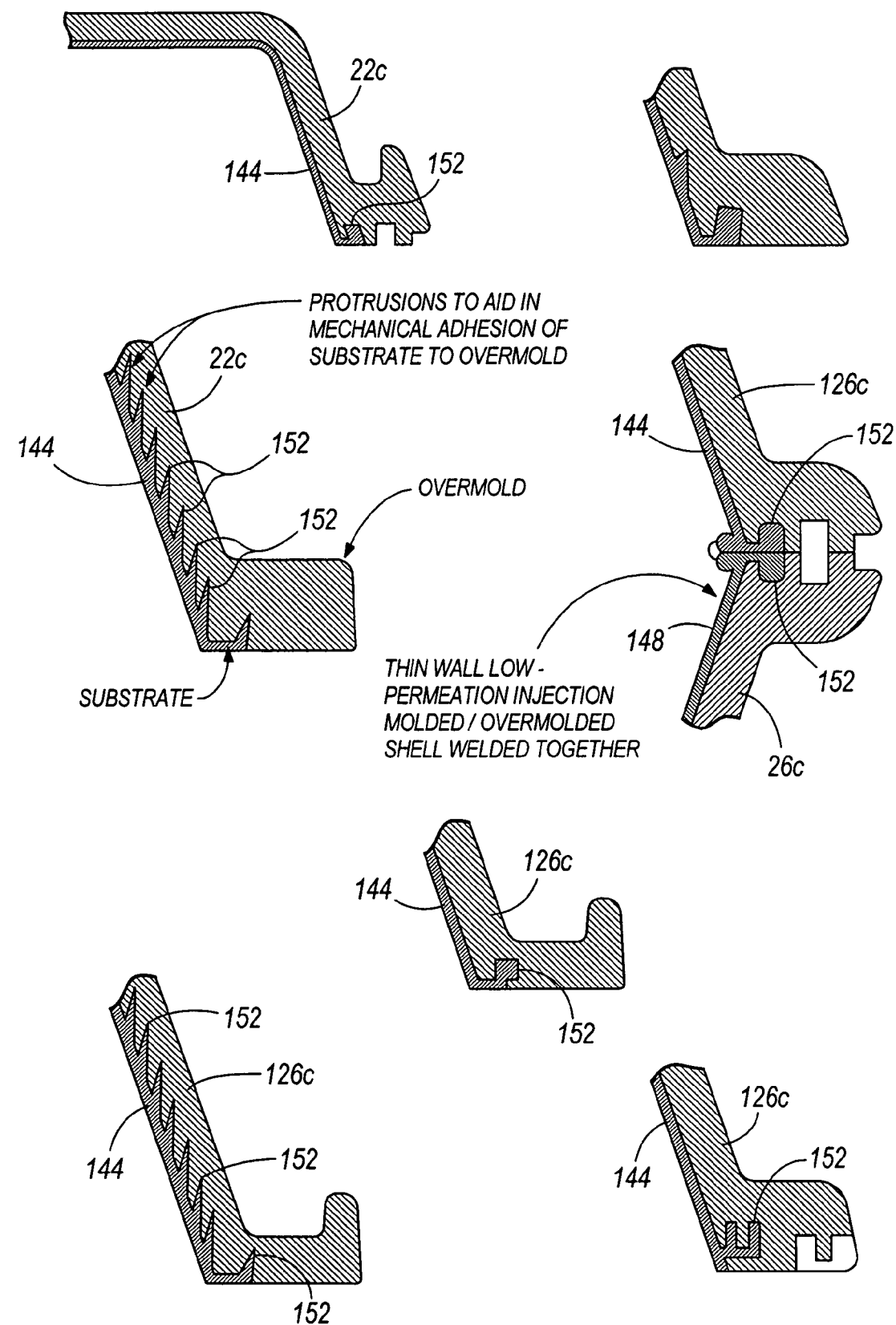
FIG. 3f is an enlarged section view of a portion of the fuel tank assembly of FIG. 3b, illustrating multiple constructions of an interface between a substrate portion and an overmold portion.

Further, the overmolded halves 144, 148 are removed from the respective molds, and the overmolded halves 144, 148 are permanently connected by a welding process such as vibration welding, laser welding, hot-plate welding, ultrasonic welding, etc. With reference to FIG. 3f, the upper and/or lower halves 144, 148 of the interior tank 120c may include structure, such as a plurality of protrusions or barbs 152, to provide additional surface area for adhesion of the overmolded upper and lower tank shells 22c, 26c.

Figure 4:
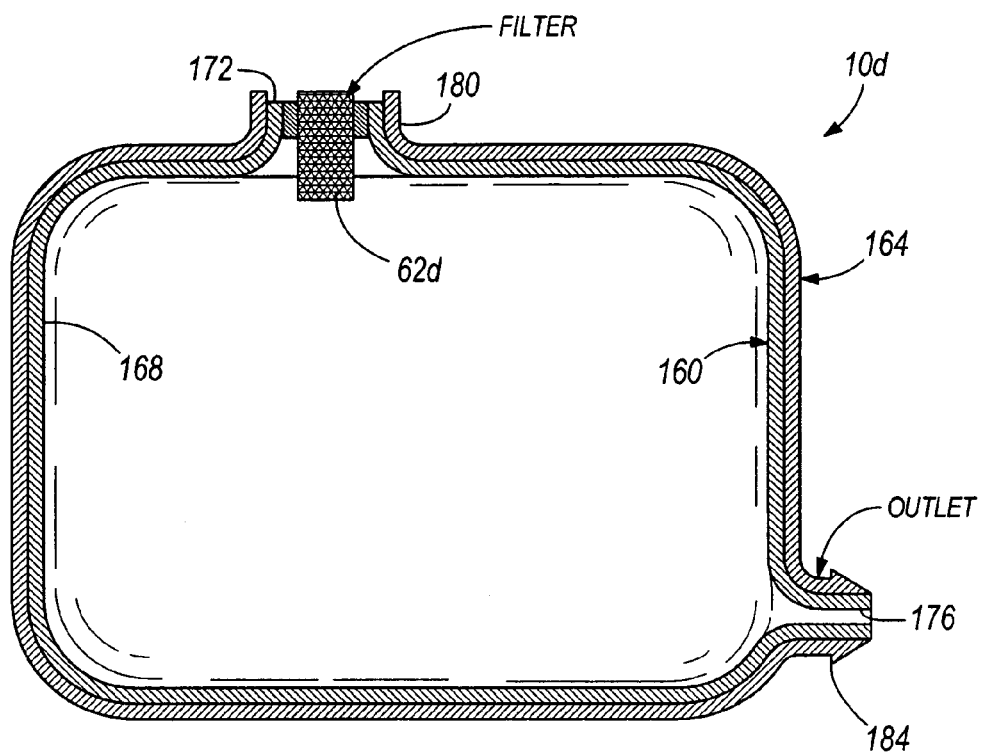
FIG. 4 is a section view of yet another fuel tank assembly embodying independent aspects of the invention, illustrating a multi-layer construction.

FIG. 4 illustrates yet another fuel tank assembly 10d embodying independent aspects of the invention. The fuel tank assembly 10d is similar to the fuel tank assemblies 10-10c of FIGS. 1-3f, such that common elements are labeled with like reference numerals "d."

The fuel tank assembly 10d generally includes an interior layer 160 acting as fluid-handling structure, and an exterior layer 164 acting as a protective structure or reinforcing layer to the interior layer 160. In the illustrated construction, the interior layer 160 is configured as a thermoform 168, which is bonded to the exterior layer 164. The thermoform 168 may be somewhat similar to the interior tank 120c of FIGS. 3b-3f, in that the thermoform 168 includes a thermoform inlet 172 to receive the fuel, and a thermoform outlet 176 to discharge the fuel to the engine.

The assembly or manufacture of the fuel tank assembly 10d may be carried out in any of a number of different ways. In one manner of assembling the fuel tank assembly 10d, the thermoform 168 is provided and inserted within a mold cavity to be insert molded. During the insert molding process, the thermoform 168 is molded over, or overmolded, by the exterior layer 164. Further, the thermoform inlet 172 is overmolded by an inlet portion 180 of the exterior layer 164, and the thermoform outlet 176 is overmolded by an outlet portion 184 of the exterior layer 164. After the insert molding process is completed, the overmolded thermoform 168 may be allowed to cool before it is removed from the mold cavity.

In providing the thermoform 168, the thermoform 168 may be manufactured using at least one layer of low-permeability material formed in a blow-molding process, for example. In such a process, the thermoform 168 may be manufactured as a single piece or a combination of multiple pieces. If multiple pieces are molded, the thermoform 168 is assembled along appropriate seams defined by the multiple pieces. The seams may be permanently connected by a, for example, heat sealing or ultrasonic welding process. However, the seams may be permanently connected using other methods, provided that the thermoform 168 is fluid-tight and liquid fuel is not allowed to leak from the thermoform 168.

In the illustrated construction, the thermoform 168 is made with a multi-layer construction having an overall thickness as low as about 0.080", and as high as about 0.320". In the illustrated construction, the thermoform 168 includes a low-permeability layer serving as a "barrier" layer and having a thickness of about 0.020" to about 0.160", and a bonding layer enclosing the low-permeability layer and having a thickness of about 0.060" to about 0.160". The bonding layer improves the bond between the thermoform 168 and the exterior layer 164. The barrier layer of the thermoform 168 substantially contains any VOC vapor emissions emanating from the fuel and prevents the VOC vapor emissions from escaping from the thermoform 168. Such a low-permeability material may include, for example, a liquid crystal polymer ("LCP"), such as Zenite® LCP, produced by E.I. du Pont de Nemours and Company, and XYDAR® LCP, produced by Solvay Advanced Polymers. Other LCP materials may also be used. An appropriate material for the bonding layer would be linear low-density polyethylene ("LLDPE").

In addition to structural protection and/or reinforcement, the exterior layer 164 may also provide UV-protection to the thermoform 168. The exterior layer 164 may be molded using an appropriate plastic material, such as high-density polyethylene ("HDPE"), that would provide these features while bonding to the bonding layer. Alternatively, other substantially rigid and/or UV-blocking materials may be utilized in molding the exterior layer 164, provided an appropriate bonding layer material is also utilized in the multi-layered thermoform 168.

Figure 5B:
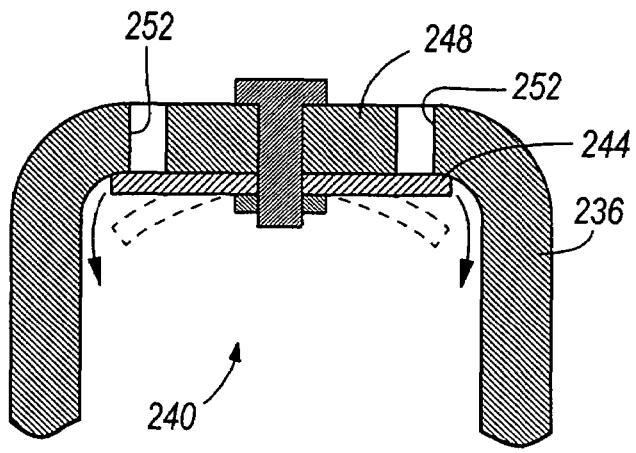
FIG. 5b is an enlarged section view of a portion of the fuel tank assembly of FIG. 5a, illustrating a vapor/liquid separating member.
Figure 5C:
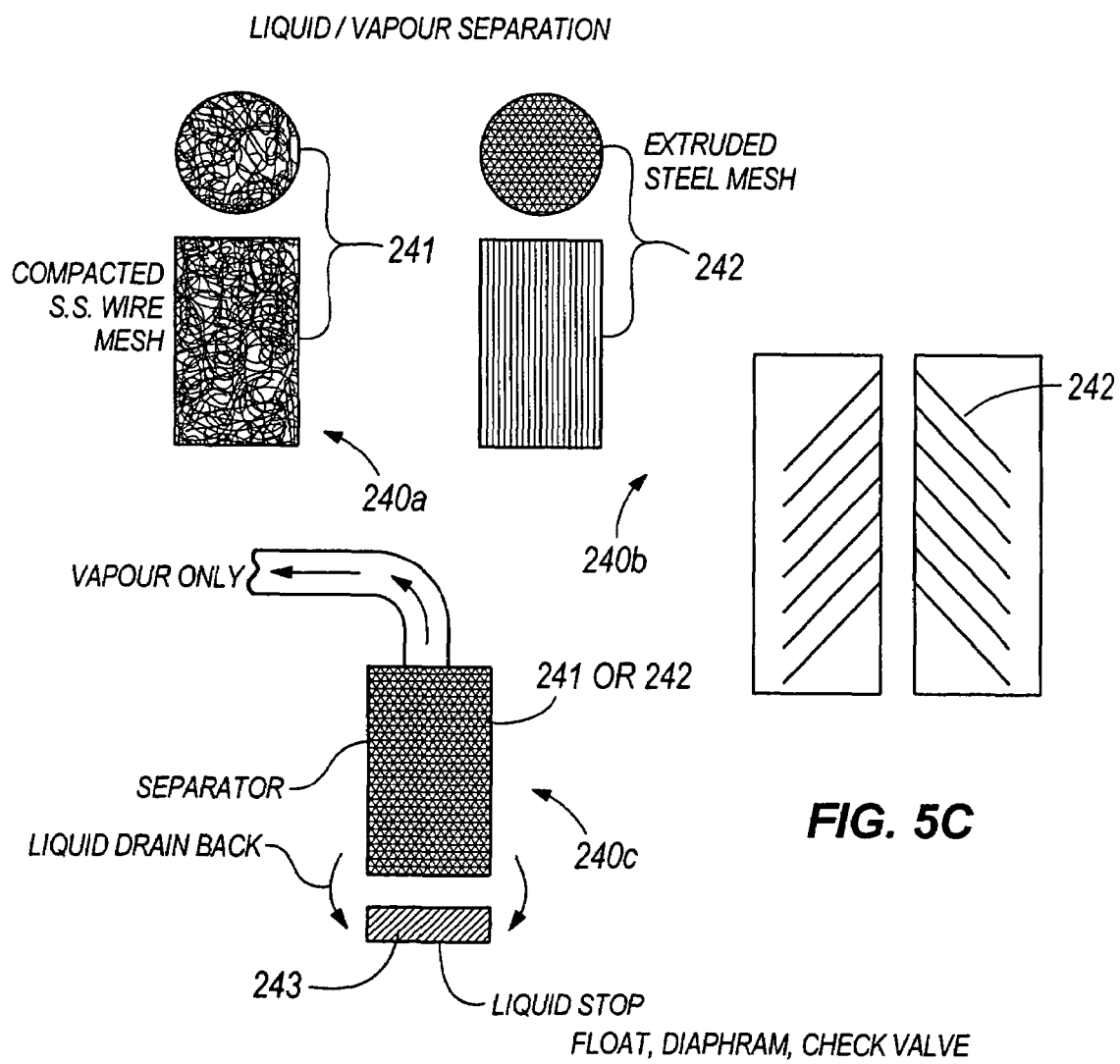
FIG. 5c illustrates alternate constructions of the vapor/liquid separating member of FIG. 5b.
Figure 6:
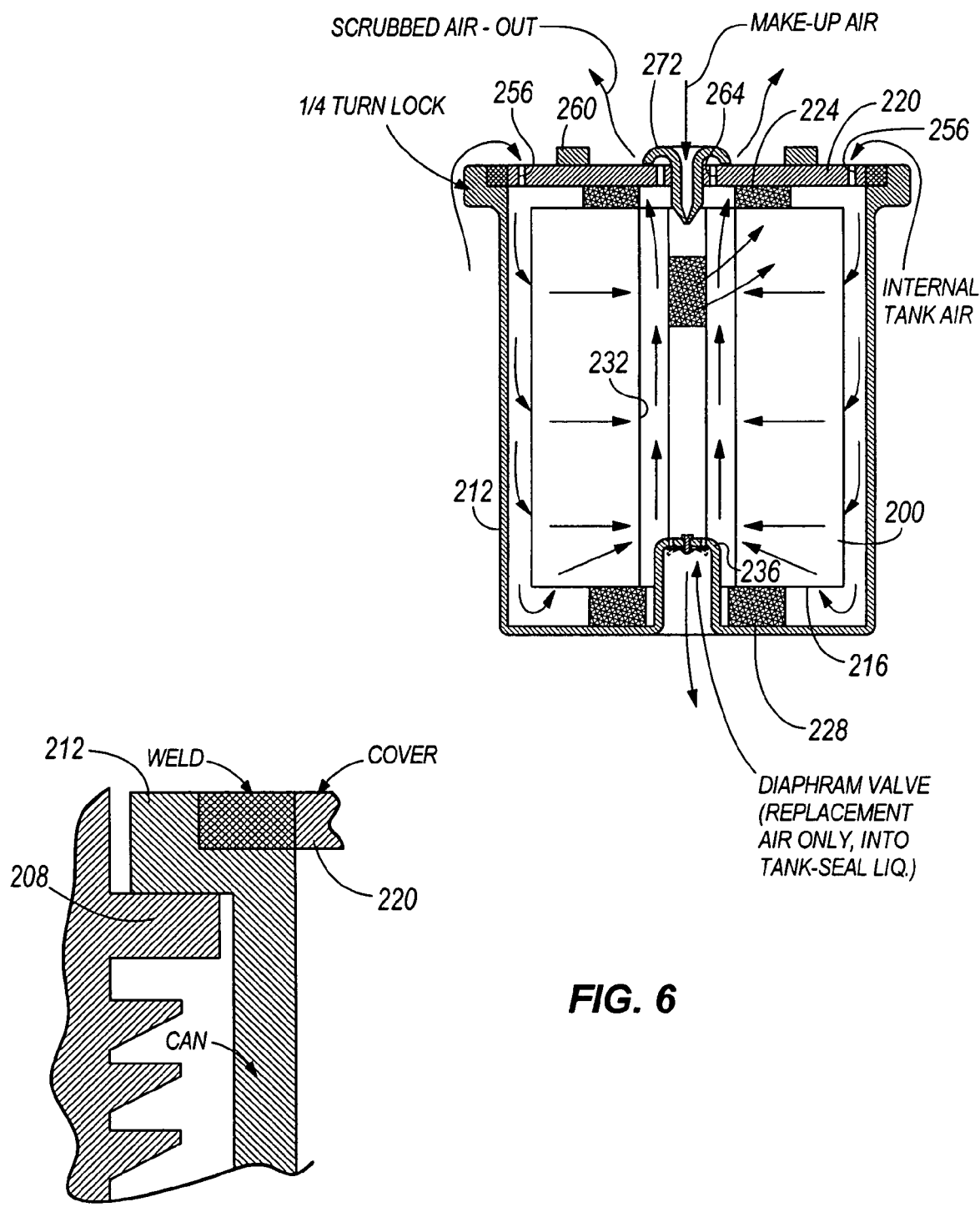

FIGS. 5a-6 illustrate yet another fuel tank assembly 10e embodying independent aspects of the invention. The fuel tank assembly 10e is similar to the fuel tank assemblies 10-10d of FIGS. 1-4, such that common elements are labeled with like reference numerals "e."

The fuel tank assembly 10e includes a fuel tank 202 and a closure device 66e having adsorption media 200 integrated or included therewith. The closure device 66e may be a cap 204 that is threadably engageable with a threaded finish on an inlet of the fuel tank 202. The cap 204 includes a threaded member 208 and a canister 212 coupled to the threaded member 208. The threaded member 208 is threadably engageable with the fuel tank 202, and the canister 212 contains the adsorption media 200.

In some constructions, the canister 212 may be releasably coupled to the threaded member 208 to allow removal and replacement of the canister 212 in the cap 204. The threaded member 208 and canister 212 may include, for example, ¼-turn locking structure to allow the canister 212 to be releasably coupled to the threaded member 208. In other constructions, the canister 212 may be permanently connected to the threaded member 208 by any of a number of processes (e.g., welding, heat sealing, bonding, press-fitting, snap-fitting, and so forth), such that replacement of the canister 212 requires replacement of the entire cap 204.

In the illustrated construction shown in FIGS. 5a-6, the canister 212 is generally cylindrically shaped to accept a generally cylindrical body 216 of adsorption media 200. The adsorption media 200 may be comprised of any material capable of adsorbing VOC vapor emissions (e.g., wood charcoal, coal charcoal, coconut hust, etc.). The body 216 of adsorption media 200 is sized to provide a gap between the outer circumferential surface of the body 216 and the inner circumferential surface of the canister 212. The body 216 of adsorption media 200 is also sized to provide a gap between the bottom surface of the body 216 and the interior bottom surface of the canister 212 and between the top surface of the body 216 and the interior top surface of the canister 212, which is partially defined by a cover member 220. As shown in FIGS. 5a and 6, generally annular sealing members 224, 228 may be inserted in the respective gaps between the body 216 and the interior top and interior bottom surfaces of the canister 212 to substantially prevent fluid flow and/or vapor flow through the gaps (e.g., flow bypassing the adsorption media 200).

During manufacturing and/or assembly of the canister 212, the body 216 of adsorption media 200 may be inserted into the canister 212 via an opening, which is subsequently closed by the cover member 220. In some constructions, the cover member 220 may be permanently connected to the canister 212 by any of a number of processes (e.g., welding, heat sealing, bonding, press-fitting, snap-fitting, etc.), such that exposure to the adsorption material 200 is substantially prevented.

In the illustrated construction, the body 216 of adsorption media 200 is also configured with an interior space 232 through the middle portion of the body 216, such that an upstanding portion 236 of the canister 212 is at least partially insertable into the interior space 232. The upstanding portion 236 of the canister 212 includes a vapor/liquid separator member 240 coupled thereto. In some constructions, the separator member 240 may be at least partially integrally formed with the upstanding portion 236, while, in other constructions the separator member 240 may be formed separately from and connected to the upstanding portion 236 by any of a number of processes (e.g., welding, heat sealing, bonding, press-fitting, snap-fitting, fastening, etc.).

The separator member 240 is configured to substantially prevent liquid fuel from entering the canister 212 and thereby saturating any portion of the adsorption media 200. In addition, the separator member 240 is configured to substantially prevent VOC vapor emissions from entering the canister 212 but bypassing the adsorption media 200. In some constructions, the separator member 240 includes a diaphragm 244 operable between a closed position, in which liquid fuel and VOC vapor emissions are not allowed to pass from the interior of the fuel tank into the canister 212, and an open position, in which clean exterior air is allowed to pass through the one-way diaphragm 244 into the fuel tank.

With reference to FIG. 5b, the separator member 240 is shown partially integrally formed with the upstanding portion 236. The separator member 240 includes a valve disc 248, which is integral with the upstanding portion 236, and the diaphragm 244 coupled to the valve disc 248. One or more apertures 252 are formed in the valve disc 248 and spaced radially from the center of the valve disc 248 to provide communication between the canister 212 and the interior of the fuel tank. The diaphragm 244 is fastened to the valve disc 248 toward the center of the diaphragm 244, such that an outer perimeter portion of the diaphragm 244 covers the one or more apertures 252 to block communication between the canister 212 and the interior of the fuel tank.

In the closed position (shown in solid lines), the diaphragm 244 is pushed against the valve disc 248 by a pressure differential between the interior of the canister 212 and the interior of the fuel tank. The pressure generated by the air with VOC vapor emissions (e.g., when the fuel tank heats up) pushes the diaphragm 244 against the valve disc 248 to block the apertures 252. As a result, communication between the canister 212 and the interior of the fuel tank via the apertures 252 is blocked. Further, liquid fuel is prevented from entering the canister 212, and VOC vapor emissions are prevented from directly entering the interior space 232 of the body 216 of adsorption media 200 and bypassing the adsorption media 200.

In the open position (shown in phantom lines), the diaphragm 244 is deflected from the valve disc 248 by a pressure differential between the interior of the canister 212 and the interior of the fuel tank. This occurs when a negative pressure, or a vacuum, develops within the interior of the fuel tank upon cooling of the fuel tank and/or emptying of the fuel tank. To balance the pressure differential, clean exterior air is allowed to flow through the apertures 252 and enter the fuel tank.

FIG. 5c illustrates alternate constructions of the separator member 240. In one construction, a separator member 240a may comprise a body 241 of compacted stainless steel wire mesh. In another construction, a separator member 240b may comprise a body 242 of extruded steel mesh. In yet another construction, a separator member 240c may comprise a liquid stop 243 (e.g., a float, diaphragm, check valve, etc.) in combination with the bodies 241 or 242 of mesh material.

The structure of the cap 204 defines a flow path between the interior and exterior of the fuel tank when the cap 204 is coupled to the fuel tank. As shown in FIGS. 5a and 6, the flow path is indicated by the arrows. Beginning from the interior of the fuel tank, air with VOC vapor emissions may enter the canister 212 via one or more inlet apertures 256 through the cover member 220. The air with VOC vapor emissions is substantially prevented from moving further radially inwardly of the canister 212 by another annular sealing member 260 between the threaded member 208 and the cover member 220. The inlet apertures 256 are shown located near the radially-outer edge of the cover member 220 and are substantially aligned with the circumferential gap between the body 216 and the interior surface of the canister 212 to provide a substantially unobstructed path into the canister 212.

Once the air with VOC vapor emissions has passed into the canister 212 through the inlet apertures 256, the air with VOC vapor emissions is made to pass through the body 216 of adsorption media 200 (e.g., radially) to reach the interior space 232. The annular sealing members 224, 228 substantially prevent the VOC vapor emissions from bypassing the body 216 of adsorption media 200 to reach the interior space 232.

As the air with VOC vapor emissions passes through the adsorption media 200, the adsorption media 200 chemically attaches to or traps the hydrocarbons and other environmentally-harmful components comprising the VOC vapor emissions. Upon reaching the interior space 232 of the adsorption media 200, hydrocarbons and other harmful components are substantially removed, resulting in "scrubbed" vapor or air.

The scrubbed air is then allowed to exit the canister 212 via a first outlet aperture 264 through the cover member 220. The first outlet aperture 264 is centrally located with respect to the cover member 220 and is directly separated from the inlet apertures 256 by the annular sealing members 224, 260 on both interior and exterior surfaces of the cover member 220.

After exiting the canister 212, the scrubbed air is allowed to exit the cap 204 via a second outlet aperture 268 in the threaded member 208. In the illustrated construction, the second outlet aperture 268 is substantially coaxial with the first outlet aperture 264 to provide a substantially unobstructed path out of the cap 204. In some constructions, a filter member (not shown) is positioned in the second outlet aperture 268 to substantially trap particulate matter. In other constructions, a conduit (not shown) may be fluidly connected with the second outlet aperture 268 to receive the scrubbed air and route the scrubbed air to the engine for combustion.

A difference in pressure between the interior and exterior of the fuel tank 202 is the driving force behind the movement of the air with VOC vapor emissions. The pressure in the interior of the fuel tank 202 may become greater than the pressure acting against the exterior of the fuel tank 202, which is usually atmospheric pressure. This is often the result of heating of the liquid fuel in the fuel tank 202, which causes evaporation of the liquid fuel to produce the VOC vapor emissions and to cause an increase in pressure in the fuel tank. If a path is available or becomes available to "vent" this built-up pressure, natural convection currents may develop in an attempt to equalize the difference. As a result, the VOC vapor emissions would typically be carried to a location of lesser pressure (e.g., outside the fuel tank) than the interior of the fuel tank.

In a first direction of the flow path (indicated by arrows with solid lines, FIG. 6), air with VOC vapor emissions is routed through the body 216 of adsorption media 200 as described above, as a result of natural convection currents transporting or carrying the air with VOC vapor emissions toward a location of lesser pressure. As described above, the adsorption media 200 chemically attaches to or traps the hydrocarbons and other environmentally-harmful components comprising the VOC vapor emissions as the air with VOC vapor emissions passes through the adsorption media 200. After the hydrocarbons and other harmful components are removed, the scrubbed vapor or air is transported or carried outside the fuel tank 202 by the natural convection currents.

In other constructions, an active or forced convection system, for example, utilizing a source of vacuum generated by the engine, may also be used to draw the VOC vapor emissions from the fuel tank 202 into the canister 212, through the adsorption media 200, and into the engine intake.

"Clean" air or "make-up" air (e.g., air not containing VOC vapor emissions) from the exterior of the fuel tank 202 is transported or carried into the interior of the fuel tank 202 by passive convection or by an active or forced convection system, for example, utilizing a source of vacuum generated by the engine. The make-up air initially passes through the filter member in which particulate matter is substantially trapped. As the make-up air passes through the body 216 of adsorption media 200, the trapped hydrocarbons and/or other harmful components may be desorbed from the adsorption media 200 in a self-cleansing process of the adsorption media 200. This cleansing process delays or prevents "saturation" of the adsorption media thereby increasing the adsorption media's ability to adsorb additional VOC vapor emissions and extending the useful life of the adsorption media 200. An active or forced convection system utilizing a source of vacuum, for example, generated by the engine, may more effectively desorb trapped hydrocarbons and/or other harmful components from the adsorption media 200 than a solely passive convection system. When used in combination with the vacuum, a valve such as a diaphragm valve, a duckbill vale, or any one-way or two-way valve that can be activated by pressure can limit the activation of active or forced convection to known parameters and therefore scale down the operation pressure.

In some instances, the location of lesser pressure is inside the fuel tank 202. One such instance occurs when fuel is discharged from the fuel tank 202, and the decreasing fuel level in the fuel tank 202 results in a lower pressure inside the tank 202 compared to the atmospheric pressure acting on the outside of the fuel tank 202. Conventionally, a vent is designed into the fuel tank 202 to allow the convective currents to establish pressure equalization between the interior and exterior of the fuel tank 202. However, such a conventional vent may allow the escape of VOC vapor emissions into the atmosphere.

In a second direction of the flow path (indicated by arrows with dashed lines, FIG. 6), the make-up air equalizes the pressure between the interior and exterior of the fuel tank 202 without allowing the escape of VOC vapor emissions from the canister 212.

In other constructions, the structure of the cap 204 may define two separate and distinct flow paths between the interior and exterior of the fuel tank to which it is coupled. In such a construction, a first flow path allows air with VOC vapor emissions to be routed through the body 216 of adsorption media 200 before scrubbed air is discharged outside of the fuel tank, and a second flow path allows make-up air from the exterior of the fuel tank to move to the interior of the fuel tank under action of a pressure differential (i.e., when the fuel level in the tank decreases). A tube located in the interior space 232 provides the structure to establish the second flow path. The tube may be coupled to the upstanding portion 236 at one end, such that the separator member 240 provides one-way fluid communication between the tube and the interior of the fuel tank. The tube may also be coupled at an opposite end to an outlet member 272 positioned in the first outlet aperture 264 of the cover member 220.

The outlet member 272 may be configured to provide an annular gap between the outer peripheral surface of the outlet member 272 and the peripheral surface of the first outlet aperture 264. Therefore, scrubbed air is allowed to pass through the annular gap to exit the canister 212 and subsequently the cap 204. In addition, clean air, or "make-up" air (e.g., air not containing VOC vapor emissions) is allowed to pass through the outlet member 272, through the interior space 232, and through the one-way separator member 240 to enter the interior of the fuel tank 202. Make-up air would be allowed to enter the fuel tank 202 under such conditions, such as when fuel is discharged from the fuel tank and the lost fuel is replaced by make-up air to maintain pressure equalization between the interior and exterior of the fuel tank 202.

It should be understood that the closure device 66e may also be used in combination with any of the fuel tank assemblies 10-10d of FIGS. 1-4 to scrub any VOC vapor emissions from the fuel tank assemblies 10-10d and vent scrubbed vapor or air from the fuel tank assemblies 10-10d.

Figure 7A:
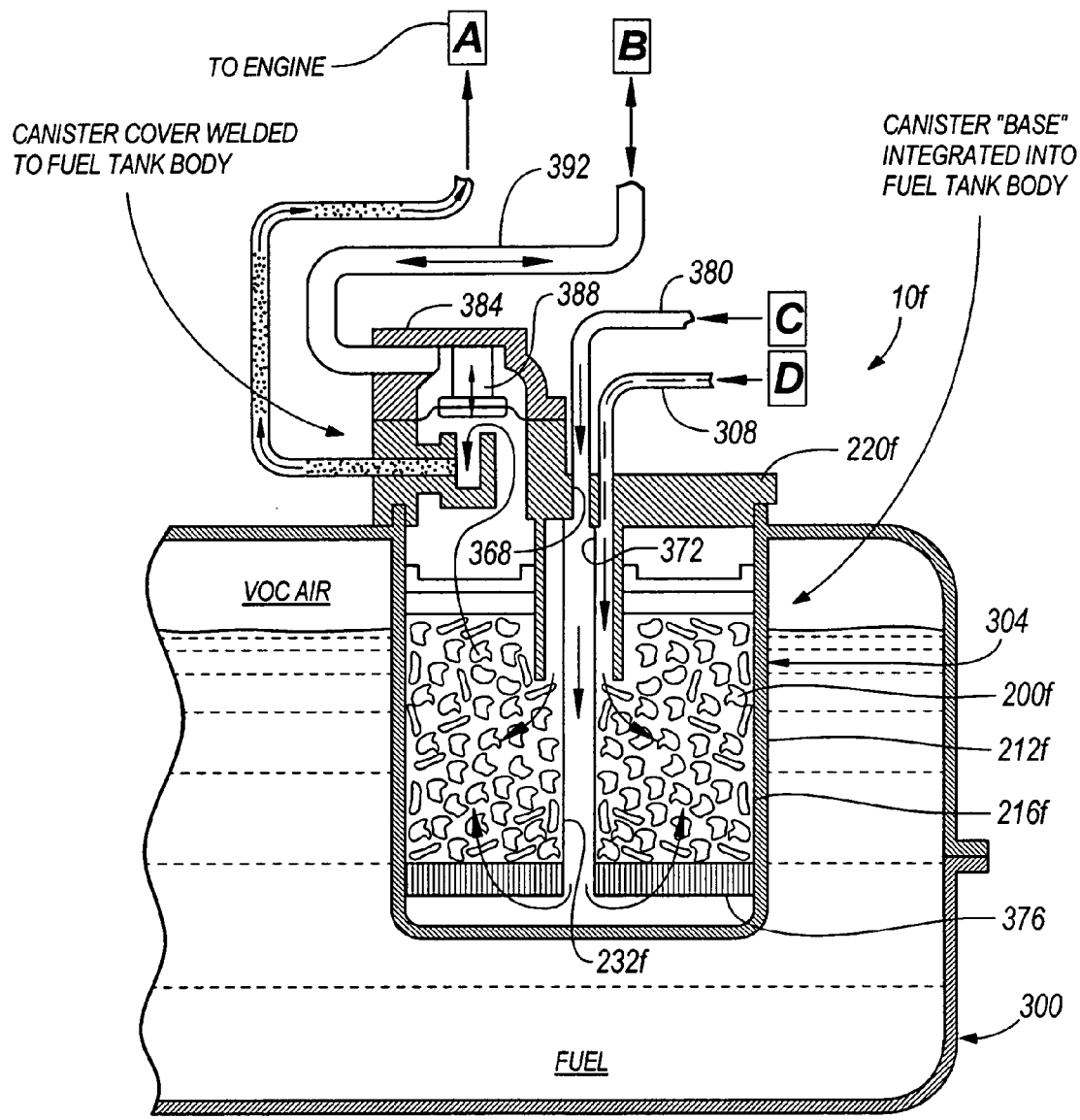
FIG. 7a is a section view of yet another fuel tank assembly embodying independent aspects of the invention, illustrating adsorption media positioned inside a receptacle portion of a fuel tank.
Figure 7B:
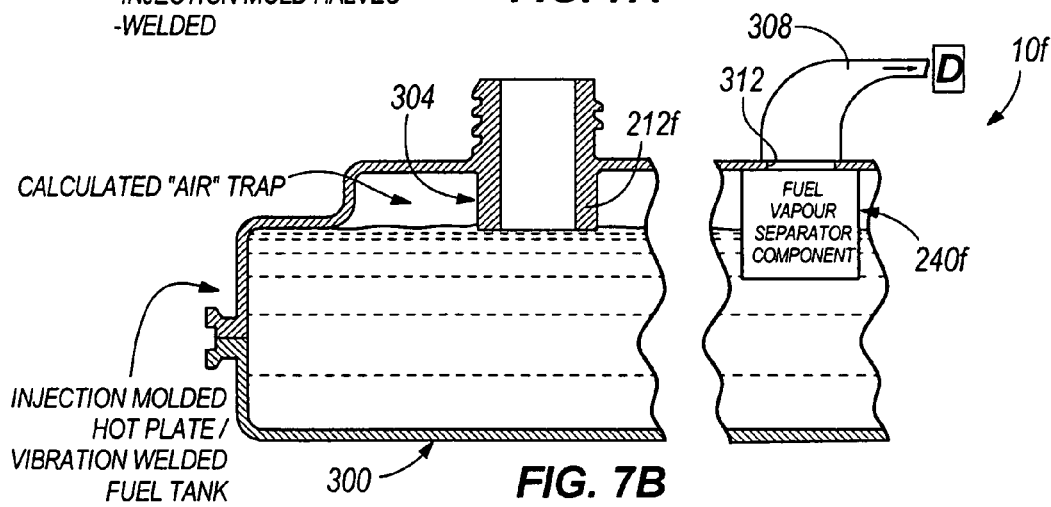
FIG. 7b is a section view of the fuel tank assembly of FIG. 7a, illustrating a fuel/vapor separating component coupled to the fuel tank.
Figure 7C:
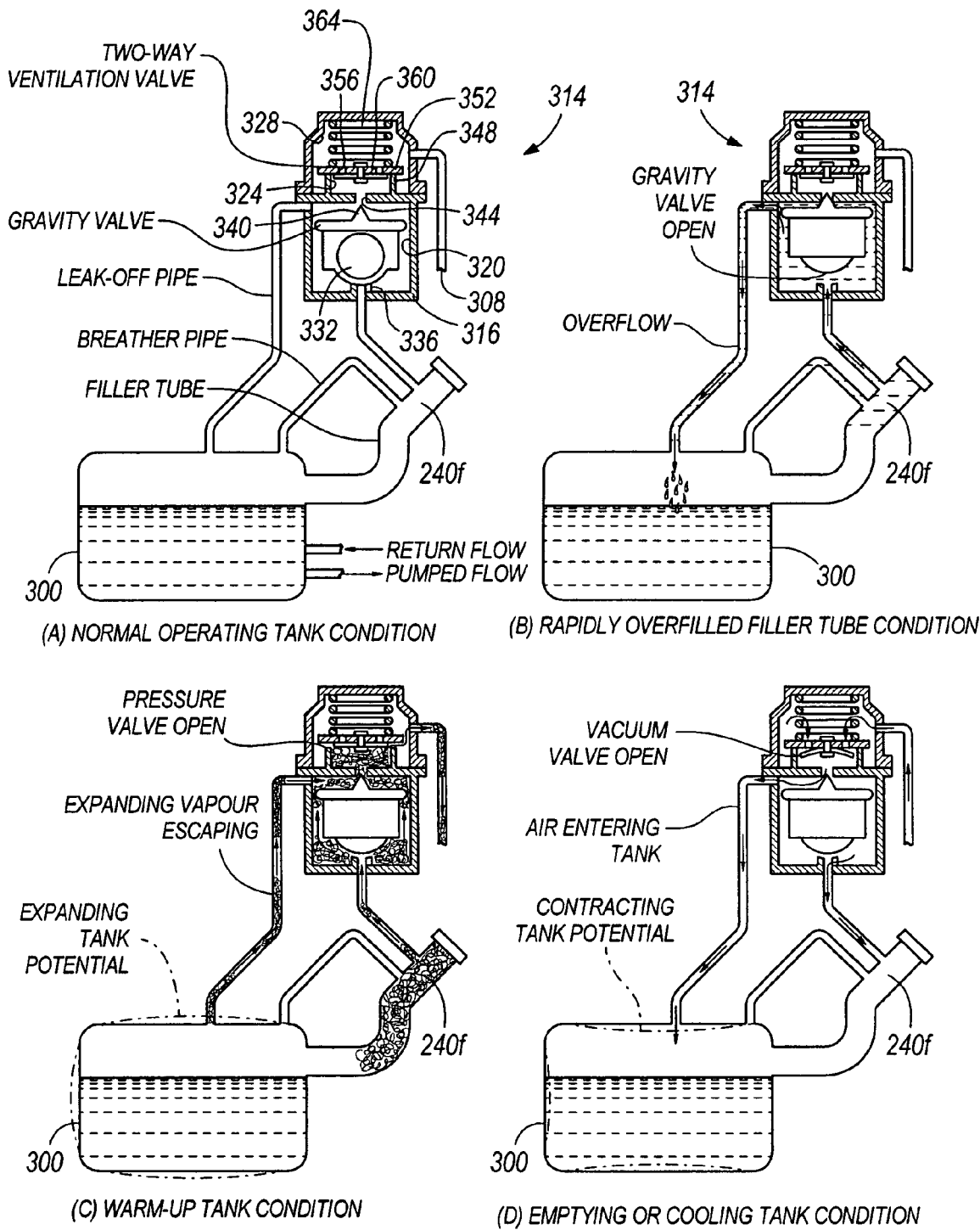
FIG. 7c is a section view of an exemplary vapor/liquid separating member fluidly connected to a fuel tank, illustrating four operating conditions of the separating member.

FIGS. 7a-7c illustrate another fuel tank assembly 10f embodying independent aspects of the invention. The fuel tank assembly 10f is similar to the fuel tank assemblies 10-10e of FIGS. 1-6, such that common elements are labeled with like reference numerals "f."

The fuel tank assembly 10f includes adsorption media 200f integrated or included with a portion of a fuel tank 300. The fuel tank 300 may include a receptacle portion 304 located in the interior of the fuel tank 300. Adsorption media 200f is insertable in the receptacle portion 304, such that the receptacle portion 304 and the structure of the fuel tank 300 define a flow path between the interior and exterior of the fuel tank 300.

In some constructions, the receptacle portion 304 may be in the form of a canister 212f that is integral with the fuel tank 300 (see FIG. 7a) and that is fluidly connected with the fuel tank 300 by a conduit 308. The conduit 308 may be rigid, semi-rigid, or flexible. However, the conduit 308 should be made of a low-permeability material or at least include a barrier layer such that VOC vapor emissions passing through the conduit 308 are substantially prevented from permeating through the conduit 308.

The fuel tank 300 may include a vapor/liquid separator member 240f in the form of a component positioned in the fuel tank outlet 312 of the fuel tank 300 (see FIGS. 5c and 7b), such as a body of compacted stainless steel wire mesh, a body of extruded steel mesh, or a liquid stop (e.g., a float, diaphragm, check valve, etc.) in combination with the bodies of mesh material. The separator member 240f may also be in the form of an enlarged filler tube (see FIG. 7c). In some constructions, the separator member 240f may be integrally formed with the fuel tank outlet 312, while other constructions may have the separator member 240f connected to the fuel tank assembly 10f by any of a number of processes (e.g., fastening, welding, heat sealing, bonding, press-fitting, snap-fitting, and so forth).

As shown in FIG. 7c, the separator member 240f is shown in the form of an enlarged filler tube. A rollover valve 314 is fluidly connected between the separator member 240f and the canister 212f. The separator member 240f generally includes a housing 316 having first, second, and third chambers 320, 324, 328. A gravity valve 332 is located in the first chamber 320, which may be fluidly connected to the fuel tank 300 at a first portion of the fuel tank 300 (e.g., the filler neck), and at a second portion of the fuel tank 300 (e.g., the top of the fuel tank). The gravity valve 332 is supported in the first chamber 320 in a biased blocking position over an inlet 336 to the first chamber 320. The gravity valve 332 also includes a projection 340 operable to engage an aperture 344 providing communication between the first and second chambers 320, 324.

The second chamber 324 is defined in part by an annular ring 348 and a two-way valve disc 352. One or more apertures 356 are formed in the valve disc 352 to provide communication between the second chamber 324 and the third chamber 328. A diaphragm 360 is fastened to the valve disc 352 toward the center of the diaphragm 360, such that an outer perimeter portion of the diaphragm 360 covers the one or more apertures 356 to block communication between the first and second chambers 320, 324.

The valve disc 352 is resiliently biased against the annular ring 348 by a spring 364 to seal the third chamber 328 from the second chamber 324. The third chamber 328 includes a connection with the canister 212f via the conduit 308 to vent air with VOC vapor emissions to the canister 212f or to receive clean exterior air from the canister 212f.

As shown in FIG. 7a, the canister 212f is generally cylindrically shaped to accept a generally cylindrical body 216f of adsorption media 200f. The canister 212f is substantially sealed to the atmosphere via a cover member 220f. The conduit 308 discharges the air with VOC vapor emissions into the canister 212f via an aperture 368 through the cover member 220f. The cover member 220f may utilize any conventional connecting structure between the conduit 308 and the cover member 220f to allow the air with VOC vapor emissions to be discharged into the canister 212f while substantially preventing the escape of the VOC vapor emissions into the atmosphere.

A substantially cylindrical tube portion 372 is located inside the canister 212f and positioned adjacent the cover member 220f, such that the air with VOC vapor emissions may be discharged to the interior of the tube portion 372. In this regard, the tube portion 372 may serve as a sub-chamber within the canister 212f. In some constructions, the tube portion 372 may be integral with the cover member 220f, while in other constructions, the tube portion 372 may be a separate and distinct component of the cover member 220f.

The generally cylindrical body 216f of adsorption media 200f is located adjacent the tube portion 372 and occupies a majority of the interior space 232f of the canister 212f. The body 216f of adsorption media 200f is also positioned relative to the cover member 220f to define an upper gap, or space therebetween. The body 216f of adsorption media 200f is supported in the canister 212f by a filter member 376, which in turn is supported in the canister 212f along its peripheral edge by, for example, a lip formed in the canister 212f. The filter member 376 is positioned relative to the bottom member to define a lower gap, or space therebetween. In addition, the body 216f of adsorption media 200f is also configured with an aperture through the middle portion of the body defining an interior space 232f. In the illustrated construction, the interior space 232f is substantially coaxial with the tube portion 372, and substantially coaxial with an aperture through the filter member 376. An air inlet conduit 380 extends through the cover member 220f, tube portion 372, the interior space 232f, and the aperture in the filter member 376. The outlet end of the air inlet conduit 380 is positioned near the bottom member such that the contents of the air inlet conduit 380 are discharged against the bottom member.

As shown in FIG. 7a, the cover member 220f includes a housing portion 384 containing an intake valve 388 therein. The intake valve 388 is selectively operable to allow scrubbed air in the upper gap to be drawn into the intake portion of the engine to be re-used for combustion. In the illustrated construction, the intake valve 388 is controlled by engine vacuum through a vacuum line 392. Alternatively, the intake valve 388 may be electrically and/or mechanically operated.

With the engine either idling or stationary there will be no vacuum signal to actuate the intake valve 388 so that VOC vapor emissions in the canister 212f are prevented from entering the intake manifold of the engine. Rather, the VOC vapor emissions rise to the highest point in the separator member 240f, or the enlarged filler tube. The relatively large and cool surface area of the filler tube condenses some of the VOC vapor emissions, which then drain back to the fuel tank 300.

With the engine running above idling speed there will be a relatively high vacuum signal in the vacuum line 392. This causes the intake valve 388 to lift of its seat. Fresh clean air may then be drawn from the clean air conduit 380 to the bottom of the canister 212f through the interior space 232f. The fresh clean air may then desorb the hydrocarbons and other harmful components from the adsorption media 200f and purge the hydrocarbons and other harmful components through the intake valve 388 to the engine intake.

During a tank warm-up condition (as illustrated in FIG. 7c), the air with VOC vapor emissions enters the first chamber 320, passes through the aperture 344 into the second chamber 324, and unseats the valve disc 352 from the annular ring 348. After the valve disc 352 is unseated, the air with VOC vapor emissions is allowed to move from the second chamber 324 into the third chamber 328, where the air with VOC vapor emissions may exit the separator member 240f via the conduit 308 and vent to the canister 212f.

During a tank emptying or cooling condition (as illustrated in FIG. 7c), clean exterior air from the canister 212f enters the separator member 240f via the conduit 308, passes through the apertures 356, unseats the diaphragm 360 from the valve disc 352, passes from the second chamber 324 into the first chamber 320, and passes into the fuel tank 300.

In operation of the fuel tank assembly 10f, the vacuum pressure of the engine in combination with the rollover valve 314 may pull VOC air from the fuel tank 300 into the canister 212f. In other embodiments, the flow of air with VOC vapor emissions is determined by the differences in pressure throughout the fuel tank assembly 10f. As previously explained, natural convection currents will transport or carry the air with VOC vapor emissions from locations of high pressure (typically inside the fuel tank 300) to locations of lesser pressure (typically inside the canister 212f) in an attempt to equalize the pressure in the fuel tank assembly 10f.

In a first flow path direction, air with VOC vapor emissions may pass through the separator member 240f, and into the canister 212f via the conduit 308. From the conduit 308, the air with VOC vapor emissions is discharged into the sub-chamber defined by the tube portion 372. From the sub-chamber, the air with VOC vapor emissions is passed downwardly, then radially outwardly through the body 216f of adsorption media 200f. As previously explained, as the air with VOC vapor emissions passes through the body 216f of adsorption media 200f, the hydrocarbons and/or other harmful components may be adsorbed, or trapped. The air eventually turns upwardly while passing through the body 216f of adsorption media 200f before exiting the body 216f. Such a tortuous path through the body 216f of adsorption media 200f causes hydrocarbons and/or other harmful components to be substantially adsorbed from the air before the scrubbed air exits the body 216f.

After exiting the body 216f, the scrubbed vapor or air moves through the space between the cover member 220f and the body 216f and is eventually routed to the housing portion 384 of the cover member 220f where the scrubbed air is selectively routed by the intake valve 388 to the intake portion of the engine for re-use during combustion.

In some constructions, "clean" air (i.e., air not containing VOC vapor emissions) may be passed through the air inlet conduit 380 and discharged against the bottom member of the canister 212f. As shown in FIG. 7a, the discharged clean air may deflect off of the bottom member and pass through the filter member 376, which substantially traps particulate matter entrained in the discharged clean air. Further, the clean air may pass through the body 216f of adsorption media 200f in conjunction with the VOC vapor emissions.

As a result, the clean air passing through the adsorption media 200f (before exiting the canister 212f) substantially desorbs VOC vapor emissions from the adsorption media 200f in a self-cleansing process. This self-cleansing process delays or prevents "saturation" of the adsorption media thereby increasing the adsorption media's ability to adsorb additional VOC vapor emissions and extending the useful life of the adsorption media. An active or forced convection system, for example, utilizing a source of vacuum generated by the engine, may also be used to draw the "clean" air from outside the fuel tank 202, into the canister 212, through the adsorption media 200, and into the engine intake.

In a second flow path direction opposite the first flow path direction, clean air from the air inlet conduit 380 may move from the canister 212f, through the conduit 308, and into the interior of the fuel tank 300 under action of a pressure differential (i.e., passively when the fuel level in the tank 300 decreases or when the fuel cools or actively, for example, utilizing a source of vacuum generated by the engine).

Figure 7D:
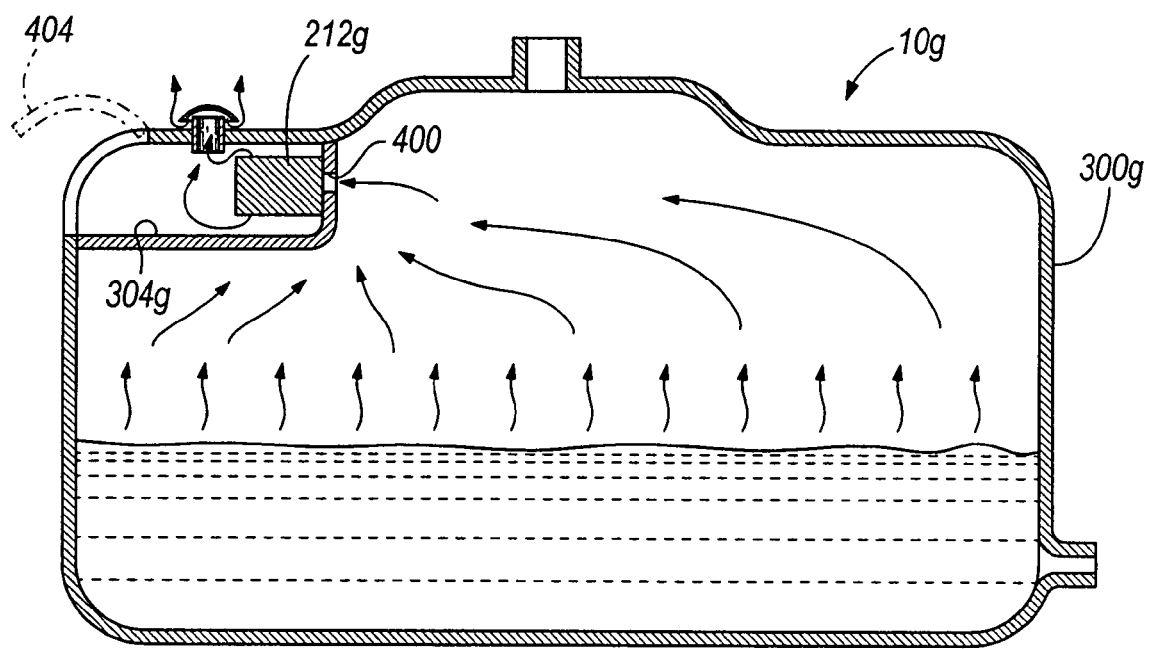

FIG. 7d illustrates another construction of a fuel tank assembly 10g having adsorption media integrated or included with a portion of a fuel tank 300g. The fuel tank assembly 10g is similar to the fuel tank assemblies 10-10f of FIGS. 1-7c, such that common elements are labeled with like reference numerals "g."

The fuel tank assembly 10g includes a receptacle portion 304g located in the interior of the fuel tank 300g. Adsorption media (e.g., in a canister 212g) is insertable in the receptacle portion 304g, such that the receptacle portion 304g and the structure of the fuel tank 300g define a flow path between the interior and exterior of the fuel tank 300g. The canister 212g may be similar to the canister 212 shown in FIGS. 5a-6, both structurally and functionally. However, the canister 212g may include external connecting structure that is engageable with connecting structure found in the receptacle portion 304g of the fuel tank 300g to support the canister 212g in the receptacle portion 304g.

To provide the flow path through the canister 212g, an inlet aperture 400 through the receptacle portion 304g may fluidly connect the interior of the fuel tank 300g and the interior of the receptacle portion 304g. From the inlet aperture 400, air with VOC vapor emissions may be passed through the canister 212g and discharged from the canister 212g, and subsequently discharged from the fuel tank 300g as "scrubbed" vapor or air via an outlet aperture (not shown) in the receptacle portion 304g. In some constructions, a vapor/liquid separator member (like that shown in FIG. 5b) may be positioned in the inlet aperture 400, such that liquid fuel is substantially prevented from entering the canister 212g. In addition, in some constructions, a filter member (not shown) may be positioned in the outlet aperture.

In some constructions, the fuel tank 300g may include a door 404 to allow outside access to the receptacle portion 304g. The door 404 may or may not be configured with the outlet aperture to vent the scrubbed air to the atmosphere. The door 404 would allow the canister 212g to be removed and replaced upon expiration of its useful life. However, in other constructions, access to the receptacle portion 304g may not be available, and removal and replacement of the entire fuel tank 300g (including the adsorption media) may be required upon expiration of the adsorption media's useful life.

In a first direction of the flow path, the air with VOC vapor emissions may pass into the receptacle portion 304g via the inlet aperture 400, and into the canister 212g. As described above, natural convection currents transport or carry the air with VOC vapor emissions from a location of high pressure (typically the inside of the fuel tank 300g) to a location of lesser pressure (typically outside the fuel tank 300g, usually at atmospheric pressure). Also, as described above, the adsorption media chemically attaches to or traps the hydrocarbons and other environmentally-harmful components comprising the VOC vapor emissions as the vapor emissions pass through the adsorption media. After the hydrocarbons and other harmful components are substantially removed, the scrubbed vapor or air is transported or carried outside the fuel tank 300g by the natural convection currents via the outlet aperture.

In a second direction of the flow path opposite the first direction, "clean" air, or "make-up" air (i.e., air not containing VOC vapor emissions) from outside of the fuel tank 300g is transported or carried into the fuel tank 300g by the natural convection currents to equalize the pressure between the inside and outside of the fuel tank 300g. This may occur substantially similarly as the canister 212 of FIGS. 5a-6. As a result, the clean air passing through the adsorption media (in canister 212g) substantially desorbs VOC vapor emissions from the adsorption media in a self-cleansing process. This self-cleansing process delays or prevents "saturation" of the adsorption media thereby increasing the adsorption media's ability to adsorb additional VOC vapor emissions and extending the useful life of the adsorption media. As previously stated, an active or forced-convection system may be used to supplement or replace the natural convection effects.

It should be understood that the fuel tank assemblies 10-10d shown in FIGS. 1-4 may also include a receptacle portion 304g housing a canister 212g containing adsorption media for adsorbing VOC vapor emissions from fuel in the fuel tank 300g. In addition, the canisters 212, 212f may also be used with the fuel tank assemblies 10-10d of FIGS. 1-4.

Figure 8:
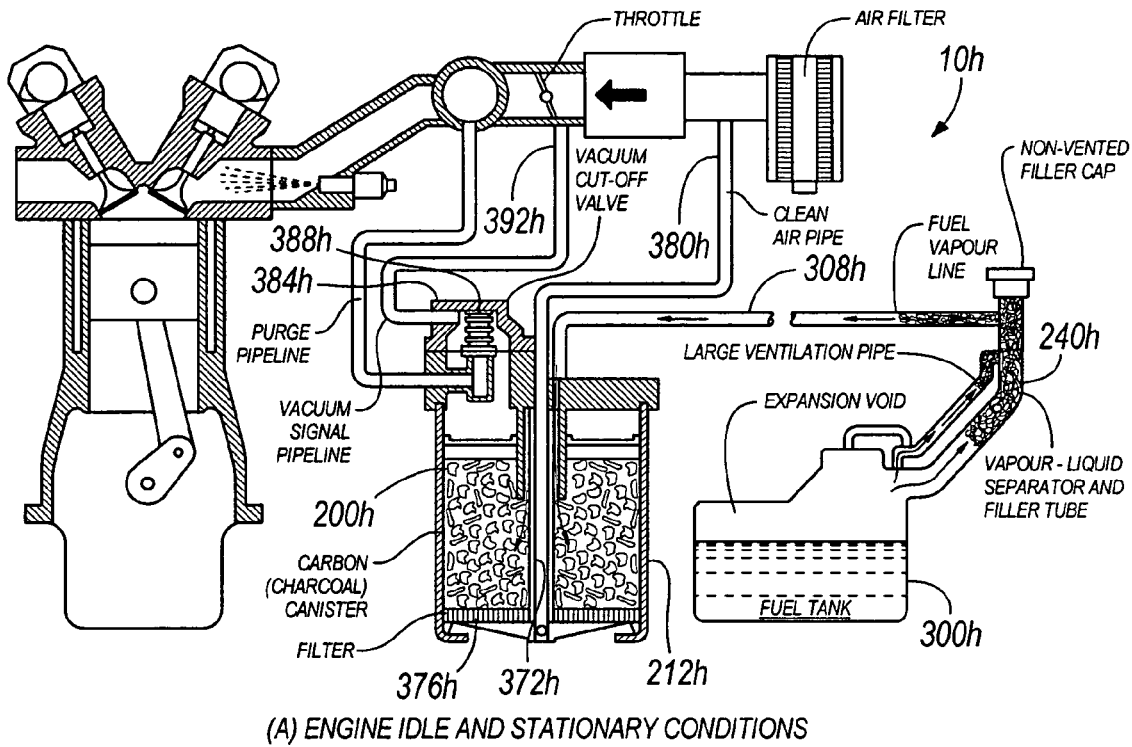
FIG. 8 is a section view of another fuel tank assembly embodying independent aspects of the invention, illustrating adsorption media remotely positioned from the fuel tank.
Figure 8:
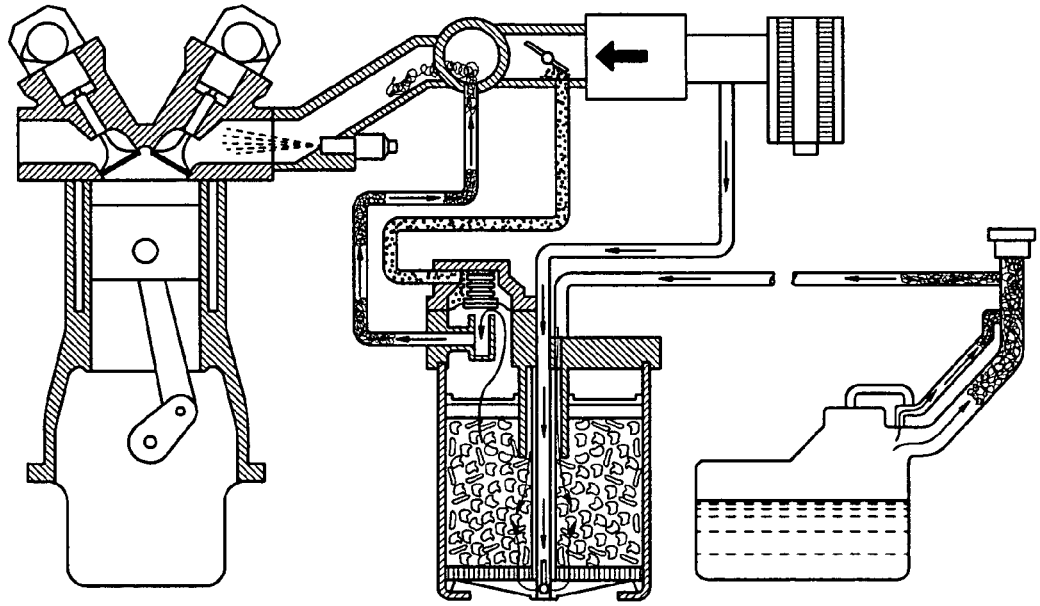

FIG. 8 illustrates yet another embodiment of a fuel tank assembly 10h of the present invention. The fuel tank assembly 10h is similar to the fuel tank assemblies 10-10g of FIGS. 1-7d, such that common elements are labeled with like reference numerals "h."

The fuel tank assembly 10h includes a remotely-positioned canister 212h containing adsorption media 200h, whereby a flow path for air with VOC vapor emissions is defined between the fuel tank 300h and the canister 212h. In the illustrated construction, the fuel tank 300h may be conventionally located adjacent or near the engine, while the canister 212h may be located a distance from the fuel tank 300h. A conduit 308h may be suitably configured to connect the fuel tank 300h and the canister 212h. The structure and operation of the remotely-positioned canister 212h may be substantially the same as the canister 212f integral or included with the fuel tank of FIGS. 7a-7d.

One or more independent features or independent advantages of the invention may be set forth in the following claims:

We claim:

1. A closure device for a tank assembly, the tank assembly including a tank wall defining an interior and an exterior, a liquid being containable in the interior, vapor being produceable from the liquid, the closure device comprising:
- a closure housing selectively connected to the tank assembly and defining a flow path between the interior and the exterior;
- adsorption media supported by the closure housing, a flow path being provided from the interior of the tank assembly, through the adsorption media and to the exterior of the tank assembly, vapor being routed along the flow path from the interior of the tank assembly and through the adsorption media, the adsorption media adsorbing the vapor;
- a media housing connectable to the closure housing and supporting the adsorption media; and
- a vapor/liquid separator connected to the media housing, the separator being operable to prevent liquid contained in the tank assembly from entering the media housing and contacting the adsorption media.

2. The device of claim 1, wherein the separator includes a valve operable between a closed position, in which liquid and vapor are not allowed to pass from the interior of the tank assembly into the media housing, and an open position, in which air from the exterior of the tank assembly is allowed to pass into the interior of the tank assembly.

3. The device of claim 1, wherein air from the exterior of the tank assembly is routed along the flow path from the exterior of the tank assembly, through the adsorption media and to the interior of the tank assembly to desorb from the adsorption media vapor adsorbed by the adsorption media.

4. The device of claim 1, wherein the tank wall defines an opening between the interior and the exterior, tank threads being defined proximate to the opening, and wherein the closure housing defines cap threads complementary to and engageable with the tank threads to connect the closure housing to the tank wall.

5. The device of claim 1, wherein the media housing is removably connectable to the closure housing.

6. A closure device for a tank assembly, the tank assembly including a tank wall defining an interior and an exterior, a liquid being containable in the interior, vapor being produceable from the liquid, the closure device comprising:
- a closure housing selectively connected to the tank assembly and defining a flow path between the interior and the exterior;
- adsorption media supported by the closure housing, a flow path being provided from the interior of the tank assembly, through the adsorption media and to the exterior of the tank assembly, vapor being routed along the flow path from the interior of the tank assembly and through the adsorption media, the adsorption media adsorbing the vapor; and
- a media housing connectable to the closure housing and supporting the adsorption media;
- wherein the media housing includes a side wall, and wherein the adsorption media is supported in the media housing with a gap between the adsorption media and the side wall, the flow path being from the interior of the tank, into the gap and through the adsorption media.

7. The device of claim 6, wherein the media housing includes a bottom wall, wherein the adsorption media is supported in the media housing with a gap between the adsorption media and the bottom wall, and wherein the device further comprises a seal positioned in the gap between the adsorption media and the bottom wall to prevent flow of vapor through the gap between the adsorption media and the bottom wall.

8. The device of claim 7, wherein the adsorption media defines a central opening, and wherein the bottom wall includes an upstanding portion extending into the central opening.

9. The device of claim 8, further comprising a separator member supported on the upstanding portion.

10. The device of claim 9, wherein the separator member includes a valve member preventing liquid and vapor in the interior of the tank assembly from entering the media housing and allowing air from the exterior of the tank assembly to pass from the central opening and into the interior of the tank assembly.

11. The device of claim 6, wherein the media housing includes a top wall connected to the side wall, wherein the adsorption media is supported in the media housing with a gap between the adsorption media and the top wall, and wherein the device further comprises a seal positioned in the gap between the adsorption media and the top wall to prevent flow of vapor through the gap between the adsorption media and the top wall.

12. The device of claim 11, wherein the top wall defines an aperture, the flow path being defined from the interior of the tank assembly, through a space between an outer surface of the side wall and the closure housing, through a space between an outer surface of the top wall and the closure housing, into the media housing through the aperture, into the gap between the adsorption media and the side wall, through the adsorption media and to the exterior of the tank assembly.

13. The device of claim 12, wherein the space between the outer surface of the side wall and the closure housing, the space between the outer surface of the top wall and the closure housing and the aperture in the top wall cooperate to define a tortuous flow path from the interior of the tank assembly into the media housing.

14. A tank assembly comprising:
- a tank housing defining an interior and an exterior and an opening between the interior and the exterior, a liquid being containable in the interior, vapor being produceable from the liquid, a flow path being defined between the interior and the exterior;
- a closure housing connectable to the tank housing to selectively close the opening;
- adsorption media supported by at least one of the tank housing and the closure housing, a flow path being provided from the interior of the tank assembly, through the adsorption media and to the exterior of the tank assembly, vapor being routed along the flow path from the interior of the tank assembly and through the adsorption media, the adsorption media adsorbing the vapor; and
- a media housing connectable to the closure housing and supporting the adsorption media;
- wherein the media housing includes a side wall, a bottom wall and a top wall defining an aperture, wherein the adsorption media is supported in the media housing with a side gap between the adsorption media and the side wall, a bottom gap between the adsorption media and the bottom wall, and a top gap between the adsorption media and the top wall, and wherein the assembly further comprises:
- a bottom seal positioned in the gap between the adsorption media and the bottom wall to prevent flow of vapor through the gap between the adsorption media and the bottom wall; and
- a top seal positioned in the gap between the adsorption media and the top wall to prevent flow of vapor through the gap between the adsorption media and the top wall;

wherein the flow path is defined from the interior of the tank assembly, through a space between an outer surface of the side wall and the closure housing, through a space between an outer surface of the top wall and the closure housing, into the media housing through the aperture, into the gap between the adsorption media and the side wall, through the adsorption media and to the exterior of the tank assembly, the space between the outer surface of the side wall and the closure housing, the space between the outer surface of the top wall and the closure housing and the aperture in the top wall cooperating to define a tortuous flow path from the interior of the tank assembly into the media housing.

15. The assembly of claim 14, wherein the tank housing defines tank threads proximate to the opening, wherein the closure housing defines cap threads complementary to and engageable with the tank threads to connect the closure housing to the tank wall, the closure housing providing the flow path, and wherein the adsorption media is supported by the closure housing.

16. A closure device for a tank assembly, the tank assembly including a tank wall defining an interior and an exterior, a liquid being containable in the interior, vapor being produceable from the liquid, the closure device comprising:
   a closure housing selectively connected to the tank assembly and defining a flow path between the interior and the exterior;
   adsorption media supported by the closure housing, a flow path being provided from the interior of the tank assembly, through the adsorption media and to the exterior of the tank assembly, vapor being routed along the flow path from the interior of the tank assembly and through the adsorption media, the adsorption media adsorbing the vapor; and
   a media housing connectable to the closure housing and supporting the adsorption media;
   wherein the adsorption media defines a central opening, a portion of the media housing being positionable in the central opening.

* * * * *